(12) United States Patent
Schmidl et al.

(10) Patent No.: US 9,014,205 B2
(45) Date of Patent: *Apr. 21, 2015

(54) WIRELESS COMMUNICATIONS WITH FREQUENCY BAND SELECTION

(75) Inventors: Timothy M. Schmidl, Dallas, TX (US); Mohammed Nafie, Richardson, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1939 days.

This patent is subject to a terminal disclaimer.

(21) Appl. No.: 11/256,591

(22) Filed: Oct. 21, 2005

(65) Prior Publication Data

US 2008/0170556 A1 Jul. 17, 2008

Related U.S. Application Data

(63) Continuation of application No. 09/777,201, filed on Feb. 5, 2001, now Pat. No. 7,050,402.

(60) Provisional application No. 60/210,851, filed on Jun. 9, 2000, provisional application No. 60/215,953, filed on (Continued)

(51) Int. Cl.
*H04J 3/16* (2006.01)
*H04L 1/16* (2006.01)
(Continued)

(52) U.S. Cl.
CPC ............ *H04L 1/1664* (2013.01); *H04L 1/0026* (2013.01); *H04L 1/0054* (2013.01); *H04L 1/1614* (2013.01); *H04L 1/1819* (2013.01); *H04L 1/1835* (2013.01); *H04W 72/02* (2013.01); *H04L 1/006* (2013.01); *H04L 1/1874* (2013.01); *H04L 1/188* (2013.01); *H04W 24/00* (2013.01); *H04W 24/06* (2013.01); *H04W 28/04* (2013.01);

(Continued)

(58) Field of Classification Search
CPC ..... H04W 24/00; H04W 24/06; H04W 28/04; H04W 28/22; H04L 1/0026
USPC .................. 370/431, 437, 465, 498; 340/3.51
See application file for complete search history.

(56) References Cited

U.S. PATENT DOCUMENTS 5,048,054 A * 9/1991 Eyuboglu et al. ............. 375/222
5,359,595 A    10/1994 Weddle et al.

(Continued)

OTHER PUBLICATIONS

"TG3-Criteria-Definitions", IEEE P802.15 Wireless Personal Area Networks (WPANs), May 21, 1999, pp. 1-26.

(Continued)

*Primary Examiner* — Dang Ton
*Assistant Examiner* — Ryan Kavleski
(74) *Attorney, Agent, or Firm* — Ronald O. Neerings; Frank D. Cimino

(57) ABSTRACT

A probe, listen and select (PLS) technique can be used to select from an available frequency spectrum a frequency band whose communication quality is suitable for wireless communication at a desired rate. Probe packets can be transmitted on different frequencies (223) during a known period of time ($T_{PLS}$), and frequency channel quality information can be obtained (225) from the probe packets. This quality information can then be used to select a desirable frequency band (227). The communication quality of the selected band can also be used as basis for selecting (141) from among a plurality of modulation and coding combinations that are available for use in communications operations.

17 Claims, 25 Drawing Sheets

Related U.S. Application Data on Jul. 5, 2000, provisional application No. 60/216,290, filed on Jul. 6, 2000, provisional application No. 60/216,436, filed on Jul. 6, 2000, provisional application No. 60/216,291, filed on Jul. 6, 2000, provisional application No. 60/216,292, filed on Jul. 6, 2000, provisional application No. 60/216,413, filed on Jul. 6, 2000, provisional application No. 60/216,433, filed on Jul. 6, 2000, provisional application No. 60/217,269, filed on Jul. 11, 2000, provisional application No. 60/217,272, filed on Jul. 11, 2000, provisional application No. 60/217,277, filed on Jul. 11, 2000, provisional application No. 60/228,860, filed on Aug. 29, 2000.

(51) Int. Cl.

| | | |
|---|---|---|
| *H04L 1/00* | (2006.01) | |
| *H04L 1/18* | (2006.01) | |
| *H04W 72/02* | (2009.01) | |
| *H04W 24/00* | (2009.01) | |
| *H04W 24/06* | (2009.01) | |
| *H04W 28/04* | (2009.01) | |
| *H04W 28/06* | (2009.01) | |
| *H04W 28/22* | (2009.01) | |
| *H04W 48/16* | (2009.01) | |
| *H04W 84/10* | (2009.01) | |

(52) U.S. Cl.
CPC .............. *H04W 28/06* (2013.01); *H04W 28/22* (2013.01); *H04W 48/16* (2013.01); *H04W 84/10* (2013.01)

(56) References Cited

U.S. PATENT DOCUMENTS

| | | | | |
|---|---|---|---|---|
| 5,515,398 | A | * 5/1996 | Walsh et al. | 375/222 |
| 5,764,516 | A | * 6/1998 | Thompson et al. | 702/17 |
| 5,907,812 | A | * 5/1999 | Van De Berg | 455/461 |
| 5,974,106 | A | * 10/1999 | Dupont et al. | 375/377 |
| 6,052,594 | A | * 4/2000 | Chuang et al. | 455/450 |
| 6,137,545 | A | 10/2000 | Patel et al. | |
| 6,138,019 | A | 10/2000 | Trompower et al. | |
| 6,157,820 | A | * 12/2000 | Sourour et al. | 455/226.2 |
| 6,240,073 | B1 | * 5/2001 | Reichman et al. | 370/319 |
| 6,327,300 | B1 | * 12/2001 | Souissi et al. | 375/219 |
| 6,370,109 | B1 | * 4/2002 | Schwartz et al. | 370/203 |
| 6,438,723 | B1 | * 8/2002 | Kalliojarvi | 714/751 |
| 6,483,814 | B1 | * 11/2002 | Hsu et al. | 370/277 |
| 6,546,045 | B1 | * 4/2003 | Benson, Jr. | 375/222 |
| 6,567,473 | B1 | * 5/2003 | Tzannes | 375/260 |
| 6,614,763 | B1 | * 9/2003 | Kikuchi et al. | 370/252 |
| 6,646,994 | B1 | * 11/2003 | Hendrichs et al. | 370/252 |
| 6,701,129 | B1 | * 3/2004 | Hashem et al. | 455/67.11 |
| 2004/0077353 | A1 | 4/2004 | Mahany | |
| 2005/0262241 | A1 | * 11/2005 | Gubbi et al. | 709/225 |

OTHER PUBLICATIONS

"Higher-Speed Physical Layer Extension in the 2.4 GHz Band", Supplement to IEEE Standard for Information Technology, IEEE Std 802.11B-1999, pp. 1-90.

"Specification of the Bluetooth System", The ad hoc SCATTERNET for affordable and Highly Functional wireless connectivity, V1.0A, Jul. 26, 1999, pp. 1-1068.

* cited by examiner

| MODE | DATA RATE (Mbps) | TARGET APPLICATION | RECEIVER SENSITIVITY | POWER CONSUMPTION ('2001) | |
|---|---|---|---|---|---|
| | | | | Rx AVERAGE | Tx AVERAGE |
| MODE 1.0 (BLUETOOTH) | 1 Mbps | | −84 dBm | 25 mW | 15 mW |
| MODE 2.0 | 2.6−3.9 Mbps | AUDIO | −78 dBm | 30 mW | 20 mW |
| MODE 3.0 | 22−44 Mbps | VIDEO, COMPUTER GRAPHICS | −69 dBm | 95 mW | 60 mW |

| FREQUENCY OFFSET | TRANSMIT POWER |
|---|---|
| +/− 550 kHz | −20 dBc |
| \|M−N\|=2 | −20 dBm |
| \|M−N\|>=3 | −40 dBm |

| PARAMETERS | MODE 1 (BLUETOOTH) | MODE 2 |
|---|---|---|
| FREQUENCY HOPPING | 1600 Hz | SAME AS BLUETOOTH |
| FILTER SPECTRUM | | SAME AS BLUETOOTH |
| MODULATION | GFSK | 16, 64 QAM |
| MAXIMUM DATA RATE | 1 Mbps | 2.6, 3.9 Mbps |
| ACQUISITION | | USING MODE 1 THEN SWITCH TO MODE 2 |
| TRANSMIT POWER | 0 dBm | 0 dBm, 6 dBm |
| DISTANCE | 10 m | 10 m |
| NOMINAL PACKET ERROR RATE | 10% | 10% |
| MARGIN + NOISE FIGURE | 37 dB | 37 dB |
| RECEIVER SENSITIVITY | -84 dBm | -84, -78 dBm |
| CODING | ARQ | ARQ + CONVOLUTIONAL CODE ACROSS PACKETS |

*FIG. 3*

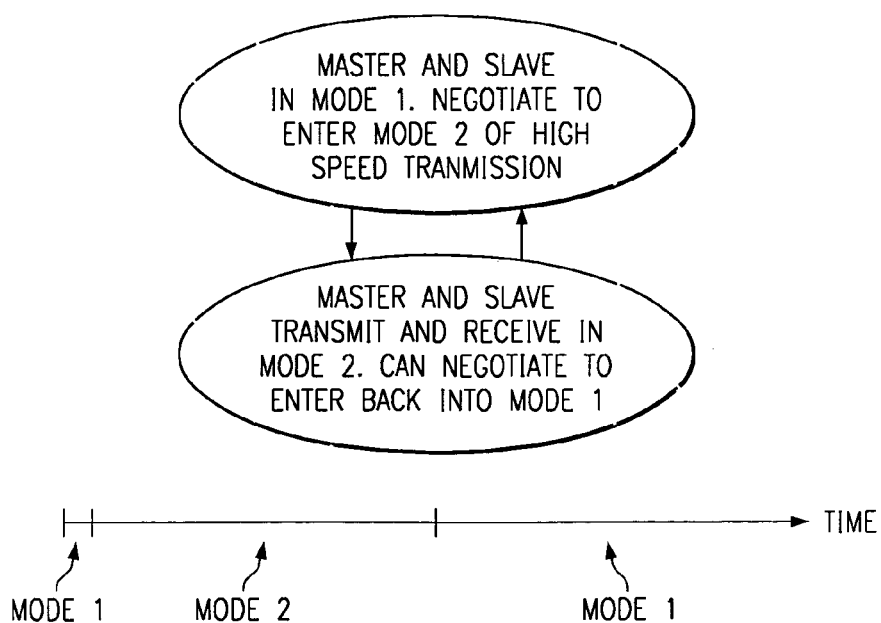

*FIG. 5*

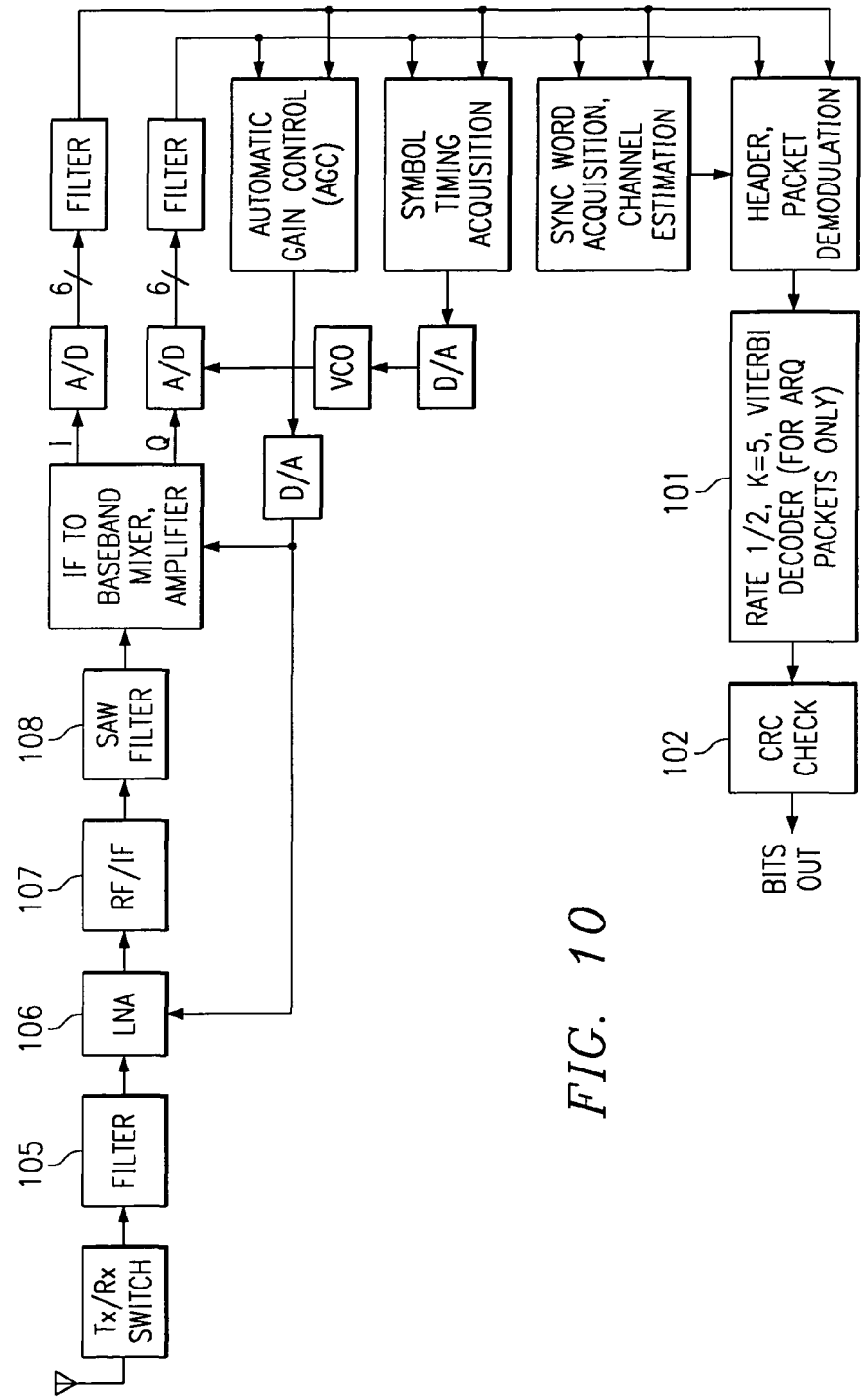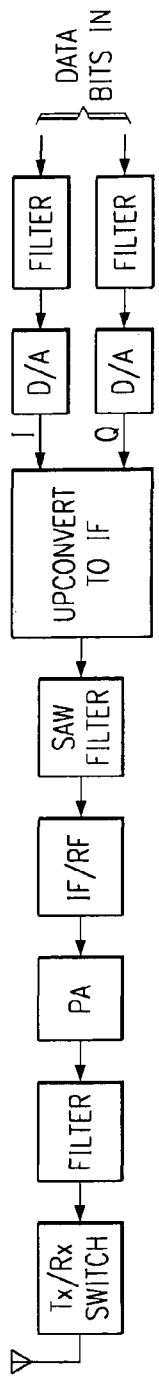
FIG. 10
FIG. 11

FIG. 14

| PARAMETERS | 1 | 2 | 3 | 4 | 5 |
|---|---|---|---|---|---|
| FILTER SPECTRUM | 802.11b | 802.11b | 802.11b | 802.11b | 802.11b |
| MODULATION | QPSK | QPSK | 16 QAM | 16 QAM | 16 QAM |
| SCRAMBLING CODE LENGTH | 256 | 256 | 256 | 256 | 256 |
| PHYSICAL DATA RATE | 22 Mbps | 22 Mbps | 44 Mbps | 44 Mbps | 44 Mbps |
| CODING | RATE 1/2, TURBO (SCCC) | NONE | RATE 1/2, TURBO (SCCC) | RATE 3/4, TURBO (SCCC) | NONE |
| ARQ | OPTIONAL | OPTIONAL | OPTIONAL | OPTIONAL | OPTIONAL |
| MAXIMUM DATA RATE | 11 Mbps | 22 Mbps | 22 Mbps | 33 Mbps | 44 Mbps |
| TRANSMIT POWER | −1 dBm | 8 dBm | 4 dBm | 8 dBm | 15 dBm |
| DISTANCE | 10 m | 10 m | 10 m | 10 m | 10 m |
| BIT ERROR RATE | 1e−8 | 1e−8 | 1e−8 | 1e−8 | 1e−8 |
| PACKET ERROR RATE | 1e−4 | 1e−4 | 1e−4 | 1e−4 | 1e−4 |
| MARGIN + NOISE FIGURE | 37 dB | 37 dB | 37 dB | 37 dB | 37 dB |
| RECEIVER SENSITIVITY | −85 dBm | −76 dBm | −80 dBm | −76 dBm | −69 dBm |
| FREQUENCY DIVERSITY | BAND SELECTION | BAND SELECTION | BAND SELECTION | BAND SELECTION | BAND SELECTION |
| SYMBOL RATE | 11 Msps | 11 Msps | 11 Msps | 11 Msps | 11 Msps |
| SPREADING | 11 Mcps | 11 Mcps | 11 Mcps | 11 Mcps | 11 Mcps |

|    | MAXIMUM DATA RATE | MODULATION | SYMBOL RATE | CODING | SPREADING |
|----|-------------------|------------|-------------|--------|-----------|
| 18 | 18 Mbps | QPSK | 18 Msps | RATE 1/2 | 18 Mchips/sec |
| 19 | 36 Mbps | QPSK | 18 Msps | RATE 1 | 18 Mchips/sec |
| 20 | 36 Mbps | 16 QAM | 18 Msps | RATE 1/2 | 18 Mchips/sec |
| 21 | 54 Mbps | 16 QAM | 18 Msps | RATE 3/4 | 18 Mchips/sec |
| 22 | 72 Mbps | 16 QAM | 18 Msps | RATE 1 | 18 Mchips/sec |

*FIG. 14A*

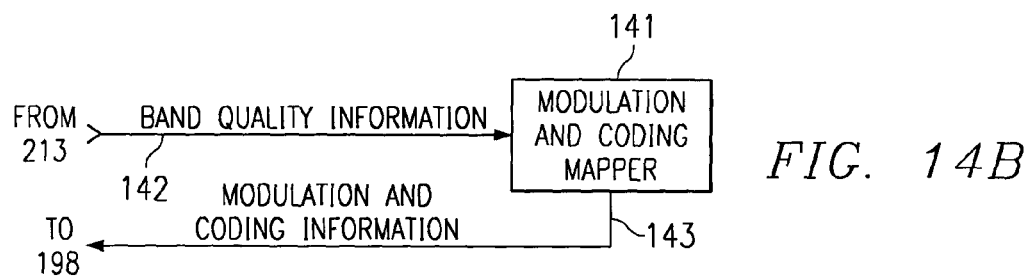

*FIG. 14B*

| PARAMETERS | 6 | 7 | 8 | 9 | 10 |
|---|---|---|---|---|---|
| FILTER SPECTRUM | 802.11b | 802.11b | 802.11b | 802.11b | 802.11b |
| MODULATION | QPSK | QPSK | QPSK | QPSK | QPSK |
| SCRAMBLING CODE LENGTH | 256 | 256 | 256 | 256 | 256 |
| PHYSICAL DATA RATE | 22 Mbps | 22 Mbps | 22 Mbps | 22 Mbps | 22 Mbps |
| CODING | RATE 1/2, TURBO | RATE 2/3, TURBO | RATE 3/4, TURBO | RATE 4/5, TURBO | RATE 5/6, TURBO |
| ARQ | OPTIONAL | OPTIONAL | OPTIONAL | OPTIONAL | OPTIONAL |
| MAXIMUM DATA RATE | 11 Mbps | 14.67 Mbps | 16.5 Mbps | 17.6 Mbps | 18.33 Mbps |

*FIG. 14C*

| PARAMETERS | 11 | 12 | 13 | 14 | 15 | 16 | 17 |
|---|---|---|---|---|---|---|---|
| FILTER SPECTRUM | 802.11b | 802.11b | 802.11b | 802.11b | 802.11b | 802.11b | 802.11b |
| MODULATION | 8-PSK | 8-PSK | 8-PSK | 8-PSK | 8-PSK | 8-PSK | 8-PSK |
| SCRAMBLING CODE LENGTH | 256 | 256 | 256 | 256 | 256 | 256 | 256 |
| PHYSICAL DATA RATE | 33 Mbps | 33 Mbps | 33 Mbps | 33 Mbps | 33 Mbps | 33 Mbps | 33 Mbps |
| CODING | NONE | RATE 1/3, TURBO | RATE 1/2, TURBO | RATE 2/3, TURBO | RATE 3/4, TURBO | RATE 4/5, TURBO | RATE 5/6, TURBO |
| ARQ | OPTIONAL | OPTIONAL | OPTIONAL | OPTIONAL | OPTIONAL | OPTIONAL | OPTIONAL |
| MAXIMUM DATA RATE | 33 Mbps | 11 Mbps | 16.5 Mbps | 22 Mbps | 24.75 Mbps | 26.4 Mbps | 27.5 Mbps |

*FIG. 14D*

| FREQUENCY OFFSET | TRANSMIT POWER |
|---|---|
| fc | 0 dBc |
| +/− 11 MHz | −30 dBc |
| +/− 22 MHz | −50 dBm |

*FIG. 15*

| PREAMBLE<br>4 BITS | ACCESS CODE<br>64 BITS | CHANNEL EDGE<br>FREQUENCY INDEX<br>6*3=18 BITS |

FIG. 28

| MPEG2 HDTV VIDEO TRANSMISSION USING MODE 3 | |
|---|---|
| VIDEO DATA RATE | 18 Mbps |
| VIDEO FRAMES/SEC | 24 |
| VIDEO FRAMES/MODE 3 SLOT | 6 |
| MODE 3 DATA RATE | 44 Mbps, 11 MSPS |
| CODING | RATE 1/2, TURBO |
| MODULATION | 16 QAM |
| TIME IN BLUETOOTH MODE ($T_1$ msec) | 25 msec |
| TIME IN BLUETOOTH MODE FOR OTHER DEVICES | 17.5 msec |
| TIME IN BLUETOOTH MODE FOR PAL | 7.5 msec |
| SLOT TIME IN MODE 3 ($T_2$ msec) | 225 msec |
| MODE 3 PACKET SIZE | 4.4 Kbits |
| DATA BITS/PACKET | 4368 |
| CRC BITS/PACKET | 32 |
| MODE 3 PACKET LENGTH | 200 $\mu$sec |
| NUMBER OF PACKETS/SLOT | 1030 |
| LENGTH OF TRAINING SEQUENCE | 81 SYMBOLS, 7.36 $\mu$sec |
| NUMBER OF PACKETS/TRAINING SEQUENCE | 10 |
| NUMBER OF PACKETS/ARQ | 100 |
| NUMBER OF TRAINING SEQUENCES/PACKET | 103 |
| TIME REQUIRED TO TRANSMIT VIDEO FRAMES (NO ARQ) | 204.5+1.5+0.76=206.76 msec |
| ARQ RATE | 9% |
| TIME REQUIRED TO TRANSMIT VIDEO FRAMES WITH ARQ | 225 msec |

WIRELESS COMMUNICATIONS WITH FREQUENCY BAND SELECTION

This application is a continuation of application Ser. No. 09/777,201 filed Feb. 5, 2001, which claims priority under 35 U.S.C. 119(e)(1) of the following U.S. provisional applications: 60/210,851 filed on Jun. 9, 2000; 60/215,953 filed on Jul. 5, 2000; 60/216,290 60/216,436, 60/216,291, 60/216,292, 60/216,413 and 60/216,433 filed on Jul. 6, 2000; 60/217,269, 60/217,272 and 60/217,277 filed on Jul. 11, 2000; and 60/228,860 filed on Aug. 29, 2000. All of the aforementioned applications are hereby incorporated herein by reference.

This application is related to the following copending applications filed contemporaneously herewith by the inventors of the present application: Ser. Nos. 09/777,203 and 09/777,221 respectively entitled "Wireless Communications with Efficient Channel Coding" and "Wireless Communications with Efficient Retransmission Operation".

FIELD OF THE INVENTION

The invention relates generally to wireless communications and, more particularly, to wireless communications that utilize: channel coding; multiple data rates; multiple modulation and channel coding schemes; or automatic repeat request (ARQ).

BACKGROUND OF THE INVENTION

The IEEE 802.15 Task Group 3 has outlined requirements for a high rate wireless personal area network (WPAN). Various data rates are to be provided to support, for example, audio, video, and computer graphics.

The present invention provides for a WPAN that supports data rates for a variety of applications including audio, video and computer graphics. According to the invention, a probe, listen and select technique can be used advantageously to select from an available frequency spectrum a frequency band whose communication quality is suitable for communication at a desired data rate. Probe packets are transmitted on different frequencies during a known period of time, and frequency channel quality information is obtained from the probe packets. This quality information is used to select a desirable frequency band. The communication quality of the selected band can also be used as a basis for selecting from among a plurality of modulation and coding combinations that are available for use in communication operations. Further according to the invention, ARQ operations can be implemented by sending a plurality of data packets in a superpacket, and responding with an ARQ acknowledgement packet that indicates which packets of the superpacket require retransmission. Further according to the invention, a data encoding algorithm can be used to generate redundant (overhead) bits from original data bits, and the data bits and redundant bits can be sent in respectively separate transmissions, if the redundant bits are needed. At the receiver, the original data bits can be determined from the received redundant bits, or the received data bits and the received redundant bits can be combined and decoded together to produce the original data bits.

BRIEF DESCRIPTION OF THE DRAWINGS

FIG. 3 illustrates in tabular format exemplary parameters associated with first and second operational modes of a WPAN transceiver according to the invention.

FIG. 5 is a state transition diagram which illustrates exemplary transitioning of transceiver devices between the modes of operation illustrated in FIG. 3.

FIG. 10 diagrammatically illustrates an exemplary embodiment of a mode 2 receiver which can implement the algorithms of FIG. 9.

FIG. 11 diagrammatically illustrates an exemplary embodiment of a mode 2 transmitter according to the invention.

FIGS. 14, 14A, 14C and 14D illustrate in tabular format exemplary parameters associated with WPAN transceivers operating in mode 3 according to the invention.

FIG. 14B illustrates part of an exemplary embodiment of the mode controller of FIG. 19A.

FIG. 15 illustrates in tabular format a transmit spectrum mask which can be used by mode 3 transceivers according to the invention.

FIG. 28 illustrates in tabular format exemplary transmission parameters which can be used for video transmission using mode 3 according to the invention.

DETAILED DESCRIPTION

The invention includes a PHY layer solution to the IEEE 802.15 Task Group 3 that offers the best solution in terms of complexity vs. performance according to the criteria document of the IEEE P802.15 Working Group for Wireless Personal Area Networks (WPANs), "TG3-Criteria-Definitions", 11 May 2000, which outlines requirements for high rate wireless personal area network (WPAN) systems, and which is incorporated herein by reference. The required data rates to be supported by a high rate WPAN according to the invention are specified in the aforementioned criteria document. The data rates for audio are 128-1450 kbps, for video are from 2.5-18 Mbps and for computer graphics are 15, 38 Mbps. Due to the wide range for the required data rates, and in order to have a cost-effective solution covering all the data rates, the invention provides for a two or three mode system in the 2.4 GHz band. The available modes include:

(1) Mode 1 is a conventional Bluetooth 1.0 system giving a data rate of 1 Mbps.

(2) Mode 2 uses the same frequency hopping (FH) pattern as Bluetooth but uses a 64 QAM modulation giving a data rate of 3.9 Mbps.

(3) Mode 3 selects a good 22 MHz band in the 2.402-2.483 GHz ISM using a probe, listen and select (PLS) technique, and transmits up to 44 Mbps using direct sequence spread spectrum (DSSS).

Figures 1, 2, 4:
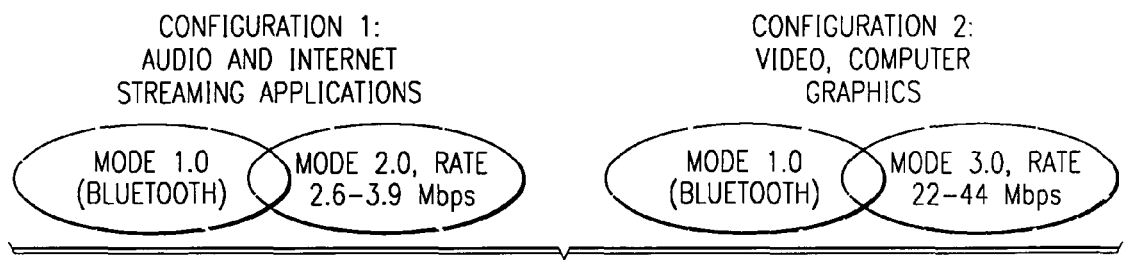
FIG. 1 illustrates in tabular format exemplary parameters of a WPAN according to the invention.
FIG. 2 diagrammatically illustrates exemplary configurations of WPAN transceiver devices according to the invention.
FIG. 4 illustrates in tabular format a transmit spectrum mask associated with the operational modes illustrated in FIG. 3.

Examples of system parameters according to the invention are summarized in FIG. 1. Wireless transceiver devices according to the invention can support any combination of the aforementioned operational modes. Examples include: devices capable of handling mode 1+mode 2 for covering audio and Internet streaming data rates of up to 2.5 Mbps; and devices capable of handling mode 1+mode 3 for covering DVD-High Quality Game applications of up to 38 Mbps. These exemplary configurations are shown diagrammatically in FIG. 2.

The mode 1 for the proposed system is conventional Bluetooth operation, which is described in detail in *Specification of the Bluetooth System*, Version 1.0A, Jul. 26, 1999, which is incorporated herein by reference.

FIG. 3 summarizes the parameters for mode 2 and also compares it to mode 1. An exemplary symbol rate for mode 2 is 0.65 Msymbols/sec. (other rates are also available) giving a bit rate of 2.6 Mbits/sec for 16 QAM (16-ary quadrature amplitude modulation) and 3.9 Mbits/sec. for 64 QAM (64-ary quadrature amplitude modulation). The transmit spectrum mask for mode 2 can be, for example, the same as Bluetooth, as shown in FIG. 4. For FIG. 4, the transmitter is transmitting on channel M and the adjacent channel power is measured on channel N. The FIG. 4 spectrum mask can be achieved, for example, by a raised cosine filter of $\alpha$=0.54 and a 3 dB bandwidth of 0.65 MHz for the symbol rate of mode 2.

In one example of operation in mode 1 and mode 2, a Bluetooth master and slave first synchronize to each other and communicate using mode 1 and then enter mode 2 upon negotiation. FIG. 5 shows an exemplary transition diagram for the master and slave to enter and exit mode 2. The entry into and exit from mode 2 is negotiable between the master and slave.

Figure 6:
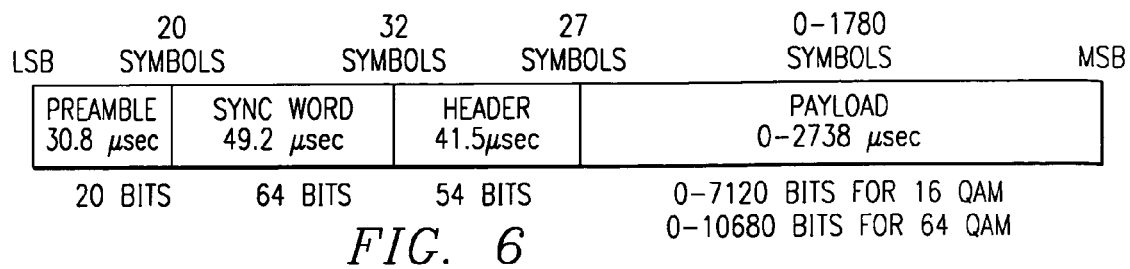
FIG. 6 diagrammatically illustrates an exemplary frame format structure for mode 2 to transmissions according to the invention.

An exemplary frame format structure for master to slave and slave to master transmissions in mode 2 is similar to mode 1 and is shown in FIG. 6. In one example the preamble consists of the pattern (1+j)*{1, −1, 1, −1, 1, −1, 1 −1, 1, −1, 1, −1, 1 −1, 1, −1, 1, −1, 1, −1}, which aids in the initial symbol timing acquisition of the receiver. The preamble is followed by the 64 bit Bluetooth sync. word transmitted using quadrature phase shift keying (QPSK), implying a 32 symbol transmission in mode 2. The sync. word is followed by the 54 bit Bluetooth header transmitted using QPSK, implying 27 symbols in mode 2. The farthest constellations in the 16/64

Figure 6A:
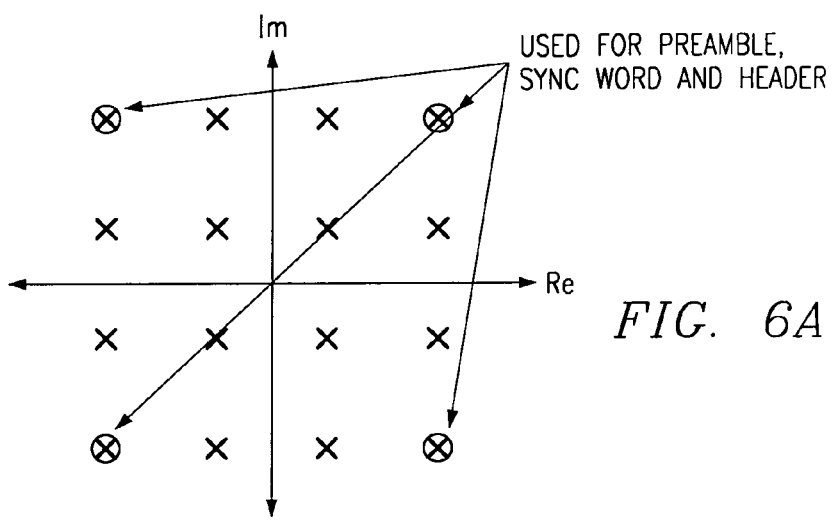
FIG. 6A graphically illustrates exemplary constellation points of the 16 QAM constellation which can be utilized for selected symbol transmission in mode 2 according to the invention.

QAM are employed for the transmission of the preamble, sync. word and header as shown in FIG. 6A. The header is followed by a payload of 1 slot or up to 5 slots, similar to Bluetooth. The maximum number of bits in the payload is thus 7120 bits for 16 QAM transmission and 10680 bits for 64 QAM transmission.

Figure 7:
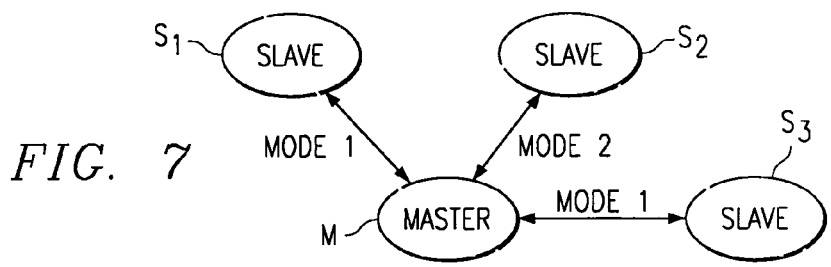
FIG. 7 diagrammatically illustrates operations of an exemplary WPAN according to the invention.
Figure 8:
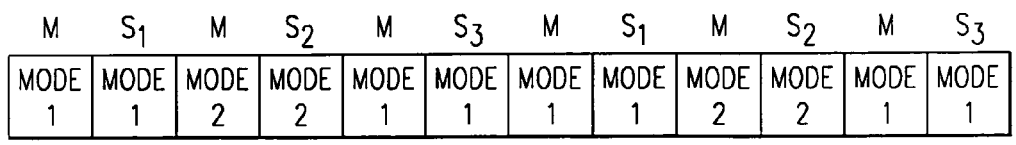
FIG. 8 is an exemplary timing diagram for communications in the WPAN of FIG. 7.

The master can communicate with multiple slaves in the same piconet, some slaves in mode 2 and others in mode 1, as shown in the exemplary WPAN of FIG. 7. The timing diagram of FIG. 8 shows an example for a Bluetooth SCO HV1 link (i.e., mode 1) between the master M and slaves $S_1$ and $S_3$, with slave $S_2$ communicating with the master in mode 2 (see also FIG. 7).

Figure 9:
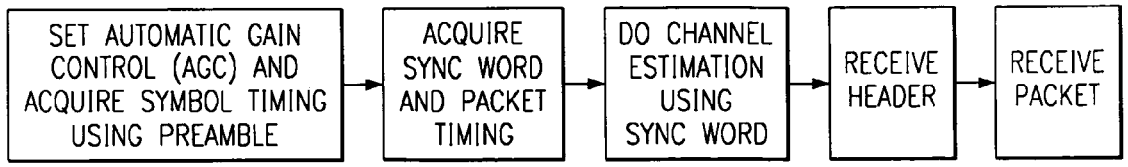
FIG. 9 diagrammatically illustrates an exemplary acquisition and packet reception algorithms for a mode 2 receiver according to the invention.

A block diagram of exemplary receiver algorithms for acquisition and packet reception in mode 2 is shown in FIG. 9, and an exemplary receiver block diagram for supporting mode 2 is shown in FIG. 10. In FIG. 10, the A/D converter can sample the incoming symbols at, for example, 2 samples/symbol, implying a 1.3 MHz sampling rate. An exemplary transmitter block diagram for supporting mode 2 is shown in FIG. 11. Several blocks can be shared between the transmitter (FIG. 11) and the receiver (FIG. 10) to reduce the overall cost of a transceiver for mode 2. Similarly, several blocks of the mode 2 transmitter and mode 2 receiver can be used also for mode 1, thereby reducing the overall cost of implementing a transceiver for combined mode 1+mode 2.

A convolutional code of rate ½, K=5 is used at 101 in the example of FIG. 10 to improve the packet error rate performance in the presence of automatic repeat requests (ARQ). Whenever the CRC of a packet is detected in error at 102, the transmitter sends the parity bits in the retransmission. The receiver combines the received data across packets in the Viterbi decoder to improve the overall performance of the receiver. A flow diagram of an exemplary scheme is shown in FIG. 12.

Figure 12:
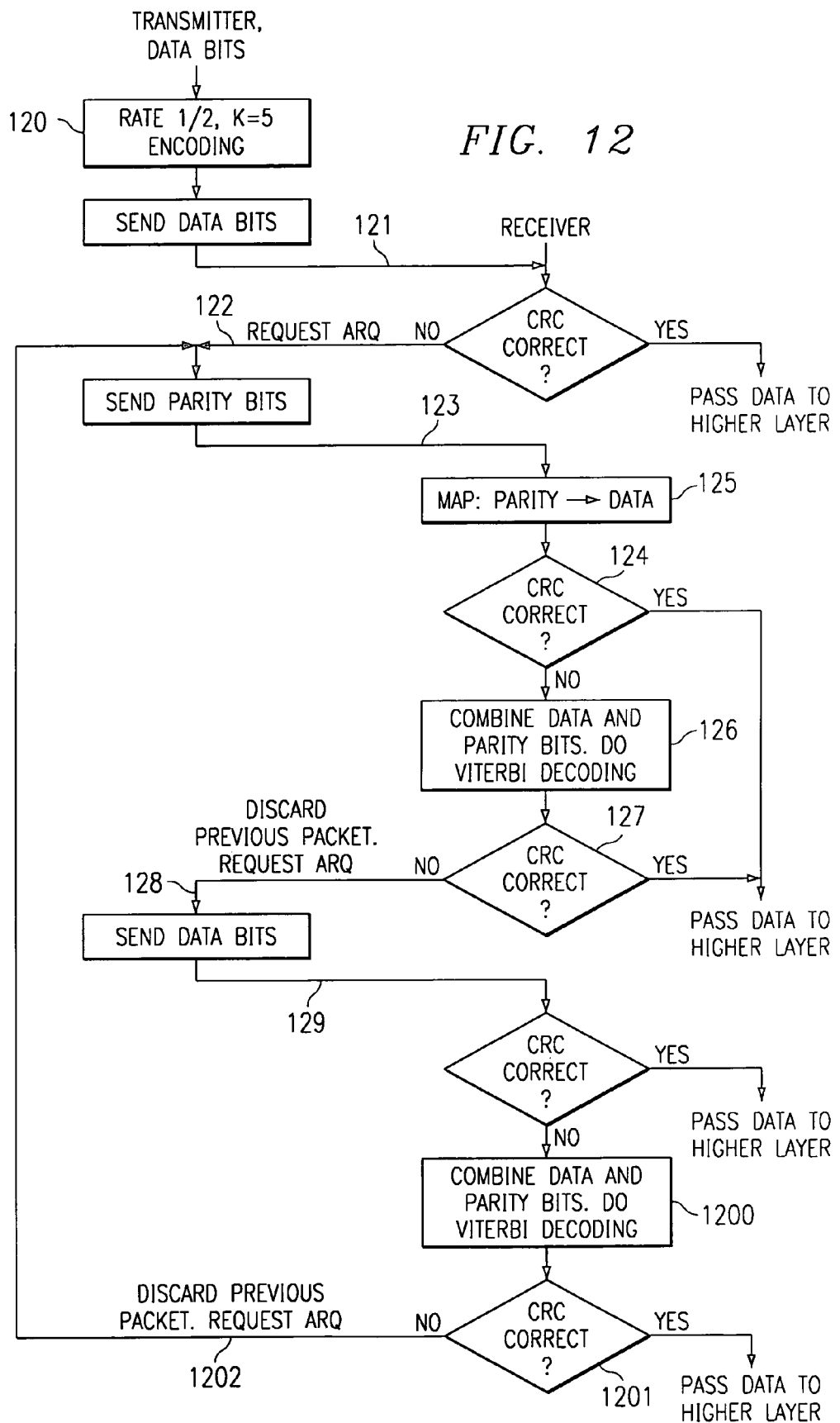
FIG. 12 illustrates exemplary transmit encoding and receive decoding operations according to the invention.

In the example of FIG. 12, the original data bits and corresponding CRC bits are encoded (e.g., using convolutional coding) at 120 to produce an encoded result that includes the original data bits and corresponding CRC bits, plus parity bits (redundant overhead bits) generated by the encoding algorithm. After the encoding operation at 120, only the original data bits and corresponding CRC bits are initially transmitted at 121. If the CRC at the receiver does not check correctly, then a retransmission is requested at 122. In response to the retransmission request, the parity bits associated with the previously transmitted data bits are transmitted at 123. At the receiver, the received parity bits are mapped into corresponding data and CRC bits using conventional techniques at 125. If the CRC of the data bits produced at 125 is correct at 124, these data bits are then passed to a higher layer. If the CRC does not check correctly at 124, then the received parity bits are combined with the associated data bits plus CRC bits (earlier-received at 121) for Viterbi decoding at 126. Thereafter, at 127, if the data bits and corresponding CRC bits generated by the Viterbi decoding algorithm produce a correct CRC result, then those data bits are passed to a higher layer. Otherwise, the data bits that were received at 121 are discarded, and a retransmission of those data bits is requested at 128.

The original data bits and corresponding CRC bits are then retransmitted at 129 and, if the CRC checks, the data bits are passed to higher layer. Otherwise, the retransmitted data bits plus CRC bits are combined with the parity bits (earlier-received at 123) for Viterbi decoding at 1200. If the data bits and corresponding CRC bits generated at 1200 by the Viterbi decoding algorithm produce a correct CRC result at 1201, then those data bits are passed to a higher layer. Otherwise, the parity bits that were transmitted at 123 are discarded, and retransmission of the parity bits is requested at 1202. Thereafter, the operations illustrated generally in the flow from 123 through 1202 in FIG. 12 can be repeated until the CRC for the data bits checks correctly or until a predetermined time-out occurs.

Figure 12A:
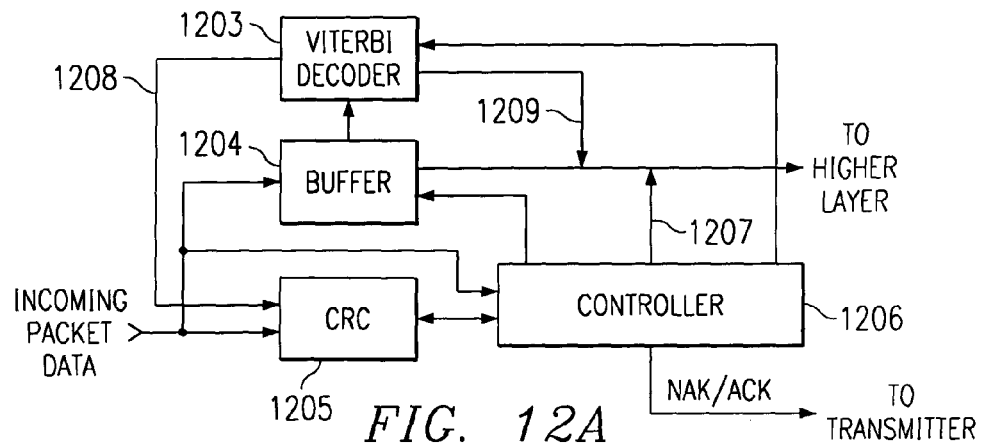
FIG. 12A diagrammatically illustrates pertinent portions of an exemplary transceiver embodiment that can perform receive operations shown in FIG. 12.

FIG. 12A diagrammatically illustrates pertinent portions of an exemplary transceiver embodiment which can implement receiver operations described above with respect to FIG. 12. The incoming packet data including, for example, the received version of the original data bits and corresponding CRC bits, is buffered at 1204 and is also applied to CRC decoder 1205. In response to the CRC decoding operation, a controller 1206 generates either a negative (NAK) or positive (ACK) acknowledgment in the form of an ARQ packet for transmission to the other end. If the CRC checks correctly (ACK), then the controller 1206 signals buffer 1204 to pass the buffered data to a higher layer. On the other hand, if the CRC did not check correctly (NAK), then, in response to the negative acknowledgement, the other end will transmit the parity bits, which are input to the controller 1206 and buffered at 1204. The controller 1206 maps the received parity bits into corresponding data and CRC bits. This mapping result is applied to the CRC decoder 1205 and, if the CRC checks correctly, the data bits are passed to a higher layer at 1207.

If the CRC of the mapping result does not check correctly, then the controller 1206 signals a Viterbi decoder 1203 to load the parity bits and data (plus CRC) bits from the buffer 1204 and perform Viterbi decoding. The resulting data (plus CRC) bits output at 1208 from the Viterbi decoder 1203 are input to the CRC decoder 1205. If the CRC of the Viterbi-decoded data bits checks correctly, then the controller 1206 directs the Viterbi decoder to pass the Viterbi-decoded data bits to a higher layer at 1209. On the other hand, if the CRC of the Viterbi-decoded data bits does not check correctly, then the controller 1206 outputs another negative acknowledgment, to which the other end will respond by retransmitting the original data (plus CRC) bits (see 129 in FIG. 12), which are received and written over the previously-received data (plus CRC) bits in buffer 1204. If the CRC for these newly-received data bits does not check, then the controller 1206 signals for Viterbi decoding of the newly-received data (plus CRC) bits and the previously-received parity bits (which are still in buffer 1204). If this Viterbi decoding does not result in a correct CRC for the data bits, then controller 1206 can output another NAK, in response to which the parity bits can be re-transmitted, input to controller 1206, and written over the previous parity bits in buffer 1204.

Figure 12B:
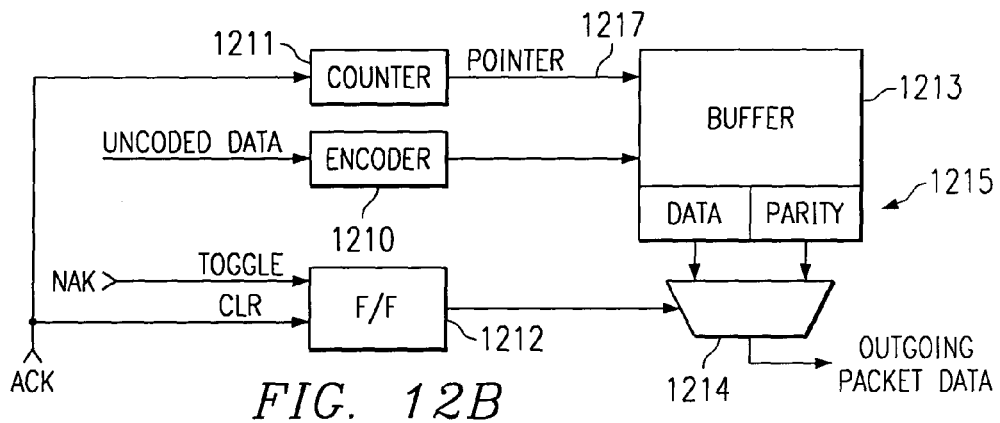
FIG. 12B diagrammatically illustrates pertinent portions of an exemplary transceiver embodiment that can perform transmit operations shown in FIG. 12.

FIG. 12B diagrammatically illustrates pertinent portions of an exemplary embodiment of a transceiver which can implement transmitter operations illustrated in FIG. 12. In FIG. 12B an encoder 1210 (e.g. a convolutional encoder) encodes the uncoded data, and stores the data (plus CRC) bits and corresponding parity bits in buffer 1213. A pointer 1217 driven by a counter 1211 points to a selected entry 1215 in buffer 1213. The data (plus CRC) bits and the parity bits of the selected entry 1215 are applied to a selector 1214 that is controlled by a flip-flop 1212. The data (plus CRC) bits of entry 1215 are initially selected for the outgoing packet. If a negative acknowledgment (NAK) is received, the flip-flop 1212 toggles, thereby selecting the parity bits of entry 1215 for the next outgoing packet. For all additional negative acknowledgments that are received, the data (plus CRC) and parity bits of entry 1215 are alternately selected at 1214 by the toggling operation of the flip-flop 1212 in response to the received negative acknowledgements. When a positive acknowledgment (ACK) is received, the flip-flop 1212 is cleared and the counter 1211 is incremented, thereby moving the pointer to select another data entry of buffer 1213 for connection to the selector 1214. Of course, the counter 1211 can also be incremented in response to a predetermined timeout condition.

Figure 13:
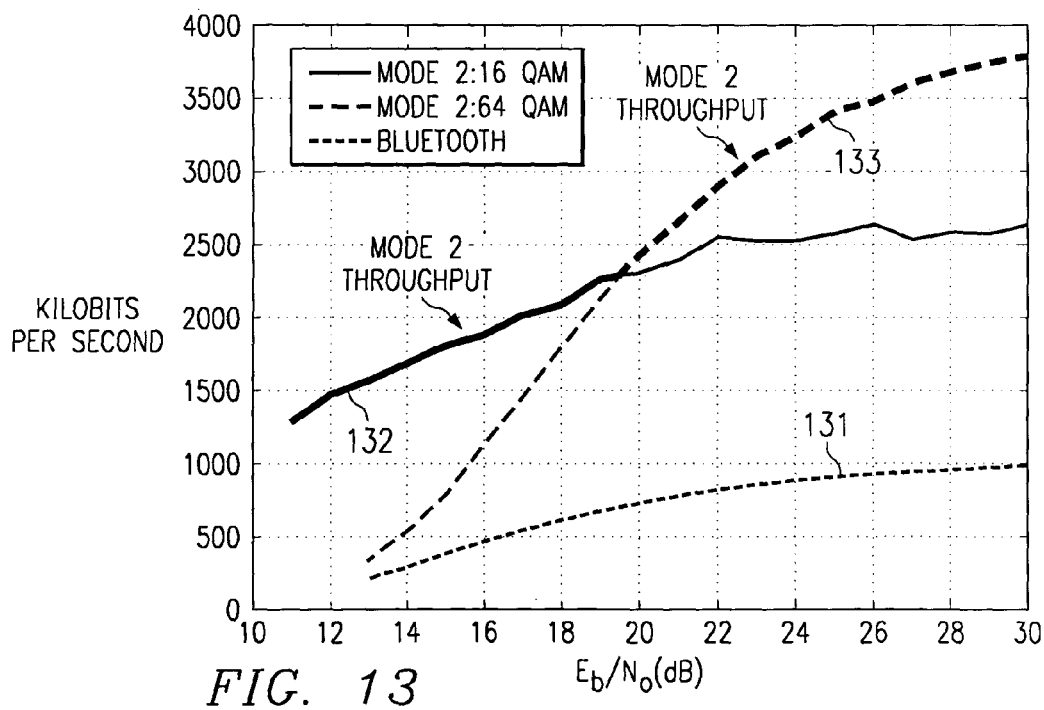
FIG. 13 graphically compares exemplary simulation results obtained using conventional Bluetooth operation (131) with exemplary simulation results obtained using mode 2 operation according to the invention with 16 QAM (132) and 64 QAM (133).

Exemplary simulation results shown in FIG. 13 compare the throughput of Bluetooth (131) against mode 2 (132, 133). The simulation assumes single path independent Rayleigh fading for each hopping frequency. This is a good model for mode 2, for the exponential decaying channel model as specified in the aforementioned criteria document. The x-axis is the average $E_b/N_0$ of the channel over all the hopping frequencies. For 16 QAM (132) mode 2 achieves 2.6× throughput of Bluetooth and for 64 QAM (133) mode 2 achieves 3.9× throughput of Bluetooth. Depending on the EbNo or other available channel quality information, the modulation scheme that offers the highest throughput can be chosen.

Figure 16:
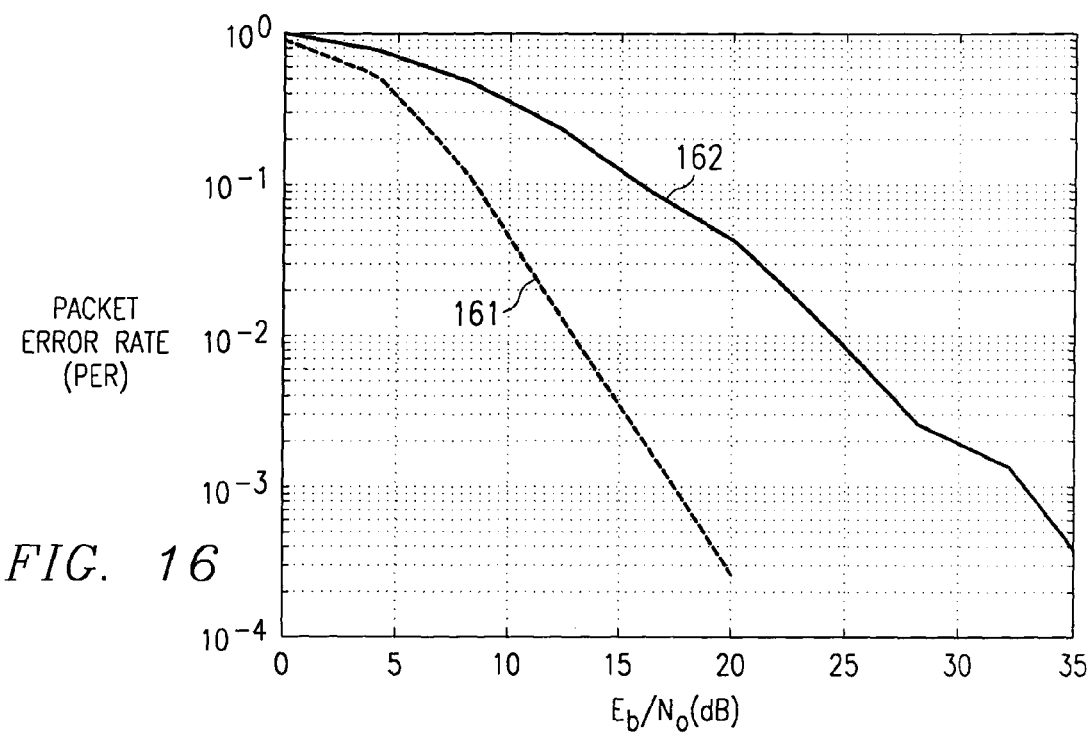
FIG. 16 graphically compares mode 3 performance with and without PLS according to the invention.

FIGS. 14, 14C and 14D illustrate exemplary system parameters for mode 3. The symbol rate in these parameter examples is 11 Msymbols/sec (which is the same as in IEEE 802.11(b)), and the spreading parameter is 11 Mchips/sec for these examples. FIG. 14A shows further parameter examples with a spreading parameter of 18 Mchips/sec and a symbol rate of 18 Msymbols/sec. The transmit spectrum mask for mode 3 can be, for example, the same as in IEEE 802.11(b), as shown in FIG. 15. At a symbol rate of 11 Msymbols/sec this spectrum mask allows a reasonable cost filter. This spectrum mask can be achieved, for example, by a raised cosine filter of α=0.22. In one example, the master and slave can start communicating in mode 1. If both devices agree to switch to mode 3, the probe, listen and select (PLS) protocol for frequency band selection is activated. In some exemplary embodiments, this protocol allows selection (for mode 3 transmission) of the best contiguous 22 MHz band in the entire 79 MHz range. This gives frequency diversity gains. FIG. 16 shows exemplary simulation results of the packet error rate (PER) for the IEEE 802.15.3 exponential channel model as specified in the aforementioned criteria document for a delay spread of 25 ns. The simulation results (using uncoded QPSK) compare performance using PLS according to the invention (161) to performance without PLS (162). The delay spread of 25 ns gives a frequency diversity of 3 to the PLS technique over the 79 MHz ISM band. This results in a performance gain for PLS of about 15 dB.

Exemplary communications between transceivers employing modes 1 and 3 can include the following: begin transmission in mode 1 and use PLS to identify good 22 MHz contiguous bands; negotiate to enter mode 3; after spending time $T_2$ in mode 3 come back to mode 1 for time $T_1$; the master can communicate with any Bluetooth devices during time $T_1$ in mode 1; also during time $T_1$ and while in mode 1, PLS can be used again to identify good 22 MHz bands; the devices again negotiate to enter mode 3, this time possibly on a different 22 MHz band (or the same band).

Figure 17:
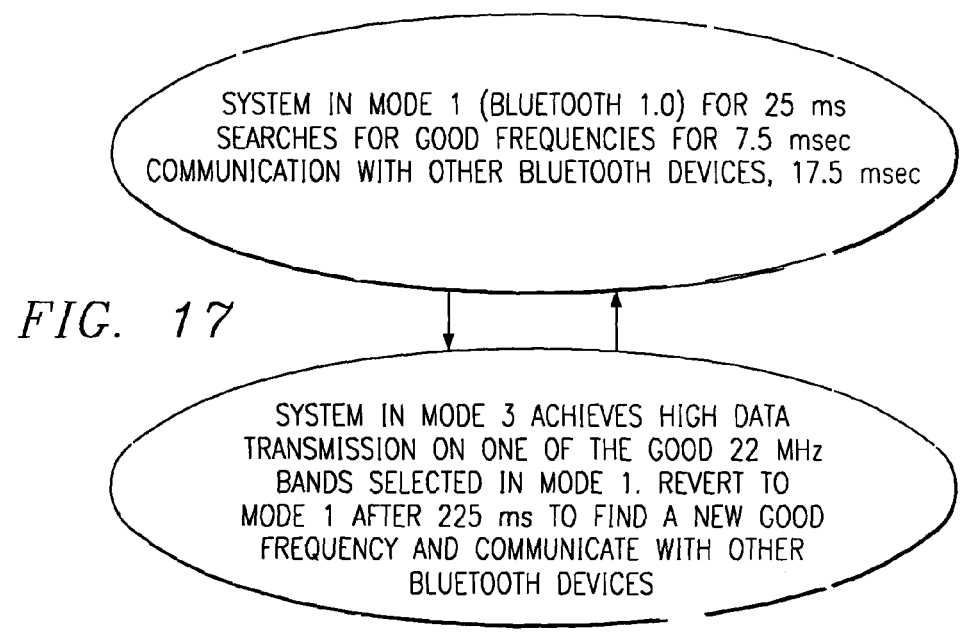
FIG. 17 is a state transition diagram which illustrates exemplary transitions of transceiver devices between mode 1 and mode 3 according to the invention.

An example with $T_1$=25 ms and $T_2$=225 ms is shown in the state transition diagram of FIG. 17. These choices allow transmission of 6 video frames of 18 Mbps HDTV MPEG2 video every 250 ms.

Figure 18:
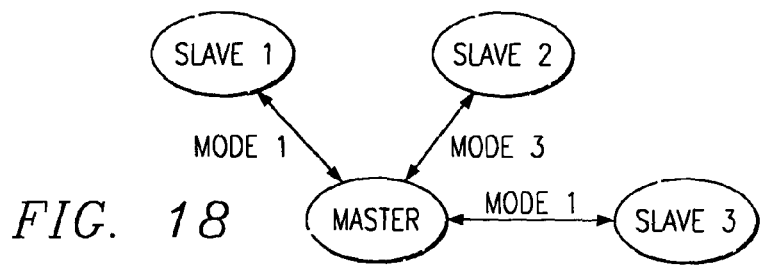
FIG. 18 diagrammatically illustrates operations of an exemplary WPAN according to the invention.

A master can communicate with several devices in mode 1 while communicating with other devices in mode 3, as shown in the exemplary WPAN of FIG. 18.

Figure 19:
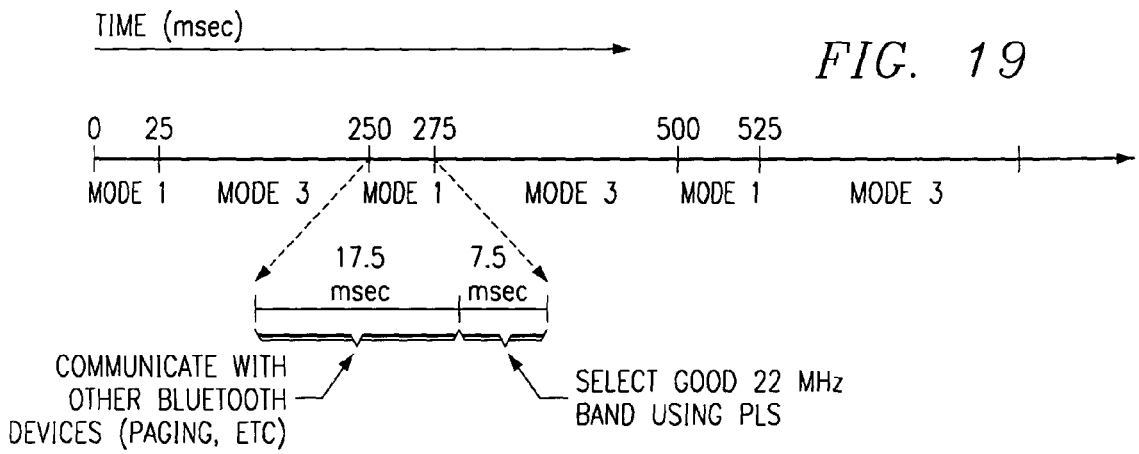
FIG. 19 is a timing diagram which illustrates the exemplary state transitions of FIG. 17 and exemplary operations which can be performed in the mode 1 state.

An exemplary timing diagram illustrating transmission in modes 1 and 3 is shown in FIG. 19. The Master and Slave communicate in Mode 3 for $T_2$=225 msec. while the remaining 25 ms are used for communicating with other Slaves (e.g. for 17.5 ms) and for PLS (e.g. for 7.5 ms) to determine the best 22 MHz transmission for the next transmission in mode 3. The time used for PLS is also referred to herein as $T_{PLS}$.

Figure 19A:
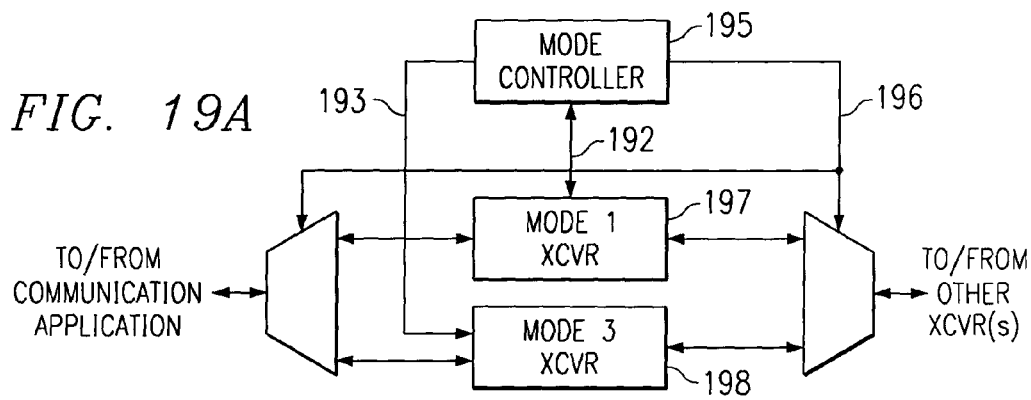
FIG. 19A diagrammatically illustrates an exemplary embodiment of a transceiver which supports mode 1 and mode 3 according to the invention.

FIG. 19A diagrammatically illustrates an exemplary embodiment of a wireless communication transceiver according to the invention. The transceiver of FIG. 19A supports mode 1 and mode 3 operation. A mode controller 195 produces a control signal 196 which controls transitions between mode 1 operation and mode 3 operation by selecting between a mode 1 transceiver (XCVR) section 197 and a mode 3 transceiver section 198. The mode controller 195 communicates at 192 with the mode 1 transceiver section 197, and also communicates at 193 with the mode 3 transceiver section 198.

Figure 20:
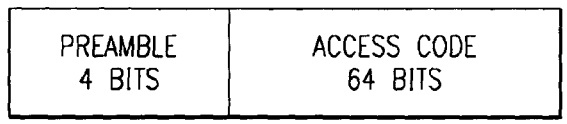
FIG. 20 diagrammatically illustrates an exemplary format of a probe packet according to the invention.

Since the Bluetooth (mode 1) transceiver 197 is capable of hopping at the maximum rate of 3200 hops/sec (each hop is on a 1 MHz band), this rate can be used for channel sounding. This means that the duration of each slot (master-to-slave or slave-to-master) is 312.5 microseconds. A pseudorandom hopping pattern is used in some embodiments. This pattern is chosen such that the entire 79 MHz range is sampled at a sufficient rate (e.g. in 5 MHz steps) to identify the best 22 MHz frequency band. Using this hopping pattern the master can, in mode 1 (Bluetooth), send the slave short packets, also referred to herein as probe packets, of the format shown in FIG. 20. Notice that exemplary probe packet of FIG. 20 is the same as a Bluetooth ID packet. The slave estimates the channel quality based, for example, upon the correlation of the access code (e.g. the Bluetooth sync word) of the received probe packet. Note that a special or dedicated probe packet is not necessarily required, because channel quality can also be estimated based on normal mode 1 traffic packets.

Figure 21:
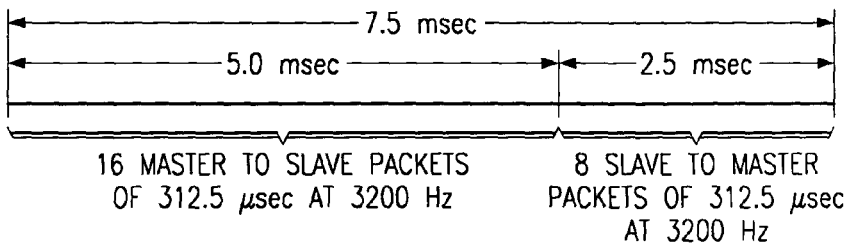
FIG. 21 illustrates in detail an example of the PLS portion of FIG. 19.

Referring to the example of FIG. 21, after 16 probe packets (each of time duration 312.5 microseconds including turn around time), the slave will decide on the best contiguous 22 MHz band to use in mode 3, and will then send the index of the lowest frequency of that band to the master 8 times using 8 slots (each of time duration 312.5 microseconds). This index will be a number from 1 to 57 (79 (bandwidth of ISM band)−22 (bandwidth in mode 3)=57), and thus requires a maximum of 6 bits. These 6 bits are repeated 3 times, so the payload of each slave-to-master packet (FIG. 22), also referred to herein as selection packets, will be a total of 18 bits. This leaves 226 μsec. for the turn around time. The number n (e.g. 16 in FIG. 21) of master-to-slave packets and the number k (e.g. 8 in FIG. 21) of slave-to-master packets can be predefined by the PLS protocol or agreed upon during the initial handshake between the master and slave. Also, the slave can send probe packets to the master so the master can evaluate the slave-to-master channel.

The channel state of each 1 MHz band can be estimated, for example, by using the maximum value of the correlation of the access code or any known part of the probe packet. This gives a good estimate of the amplitude of the fading parameter in that 1 MHz channel. The best 22 MHz band can then be chosen using this information.

For example, for each contiguous 22 MHz frequency band, where the jth frequency band is designated f(j), a quality parameter $q_{f(j)}$ can be calculated as follows $$q_{f(j)} = \sum_i |\alpha_i|^2$$

where $|\alpha_i|$ is the magnitude of the fading parameter amplitude estimate (e.g. a correlation value) for the ith frequency hop in f(j). The frequency band f(j) having the maximum $q_{f(j)}$ is taken to be the best band.

As another example, a quality parameter $q_{f(j)}$ can be calculated for each contiguous 22 MHz band as $$q_{f(j)} = \min|\alpha_i|$$

and the band f(j) having the maximum $q_{f(j)}$ is selected as the best band.

As another example, the following quality parameters can be calculated for each contiguous 22 MHz band:

$$q_{f(j)} = \sum_i |\alpha_i|^2$$

$$A_{f(i)} = \min|\alpha_i|$$

$$B_{f(j)} = \max|\alpha_i|$$

Those frequency bands f(j) whose associated $A_{f(j)}$ and $B_{f(j)}$ produce a ratio $A_{f(j)}/B_{f(j)}$ larger than a predetermined threshold value can be identified, and the one of the identified frequency bands having the largest $q_{f(j)}$ is taken to be the best band. The threshold value can be determined, for example, empirically on the basis of experimentation for desired performance in expected channel conditions.

Consider a PLS example with n=16 and k=8. This indicates that the 79 MHz band should be sampled in 5 MHz steps. The hopping pattern is therefore given by:
o={0, 5, 10, 15, 20, 25, 30, 35, 40, 45, 50, 55, 60, 65, 70, 75}.

The ith PLS frequency hop is defined to be f(i)=(x+o(i)) mod(79); i=1, 2 . . . , 16

Here x is the index of the Bluetooth hopping frequency that would occur at the beginning of the PLS procedure, and can have values of x=0, 1, 2, . . . , 78. The index i can be taken sequentially from a pseudo random sequence such as:
P={16, 4, 10, 8, 14, 12, 6, 1, 13, 7, 9, 11, 15, 5, 2, 3}.
Different pseudo random sequences can be defined for different values of n and k.

The 8 transmissions from the slave to the master can use, for example, the first 8 frequencies of the sequence f(i), namely f(i) for i=1, 2, . . . , 8.

The above exemplary procedure can be summarized as follows:

1. Master sends to the slave the probe packet on the frequencies determined by the sequence f(i). The transmit frequency is given by (2402+f(i)) MHz;
2. Slave estimates the quality of each channel;
3. After 16 master-to-slave probe packets, the slave estimates the best 22 MHz band using all the quality information it has accumulated;
4. The slave sends to the master a selection packet including the index of the lowest frequency of the best 22 MHz band;
5. The slave repeats step 4 a total of 8 times; and
6. Transmission starts in mode 3 using the selected 22 MHz band.

Figure 23:
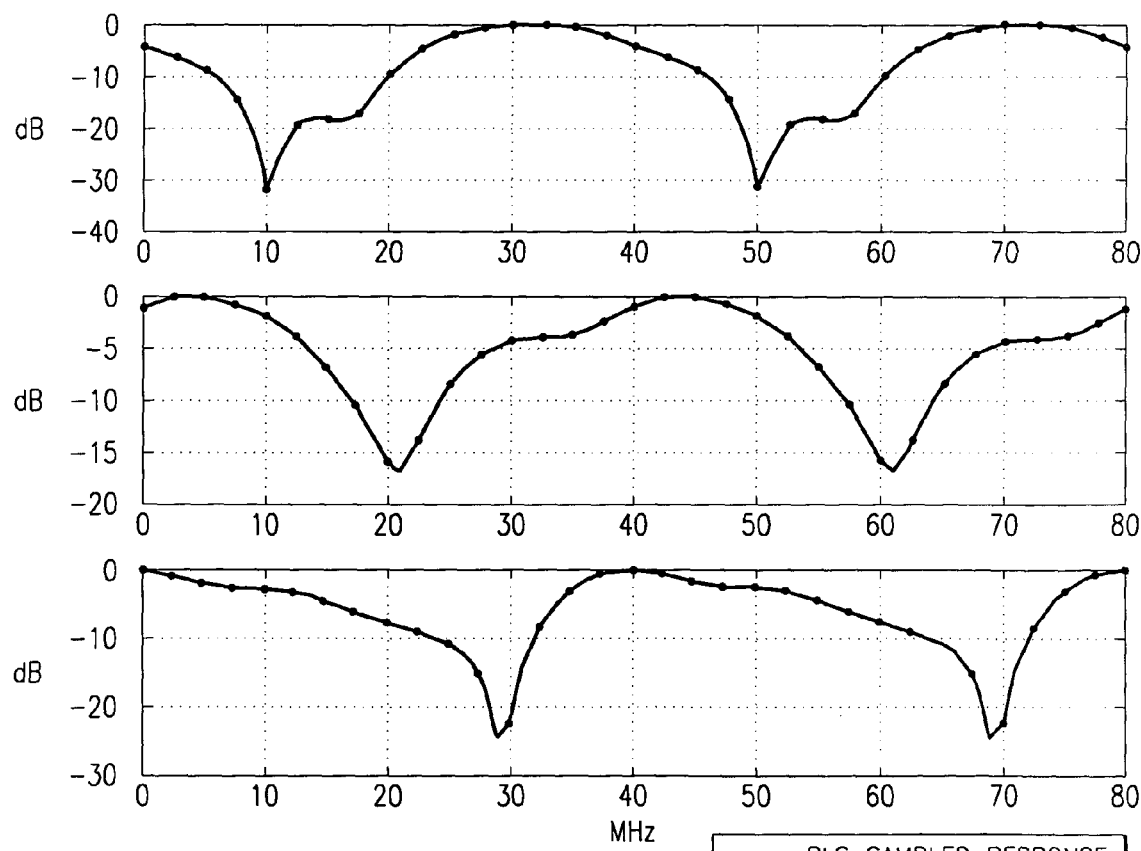
FIG. 23 graphically illustrates exemplary PLS sampling results obtained according to the invention.

Example results of the PLS procedure applied to the exponentially fading IEEE 802.15.3 channel for a delay spread of 25 ns. are shown in FIG. 23 wherein the 79 MHz channel is sampled at a 5 MHz spacing. As shown, the 5 MHz spacing can identify good 22 MHz contiguous bands in the 79 MHz bandwidth. The 1, 5, 22 and 79 MHz parameters described above are of course only exemplary; other values can be used as desired. As one example, rather than hopping on 1 MHz channels, the system could hop over different bandwidth channels (e.g. a 22 MHz channel) and transmit data occupying the whole channel.

Figure 21A:
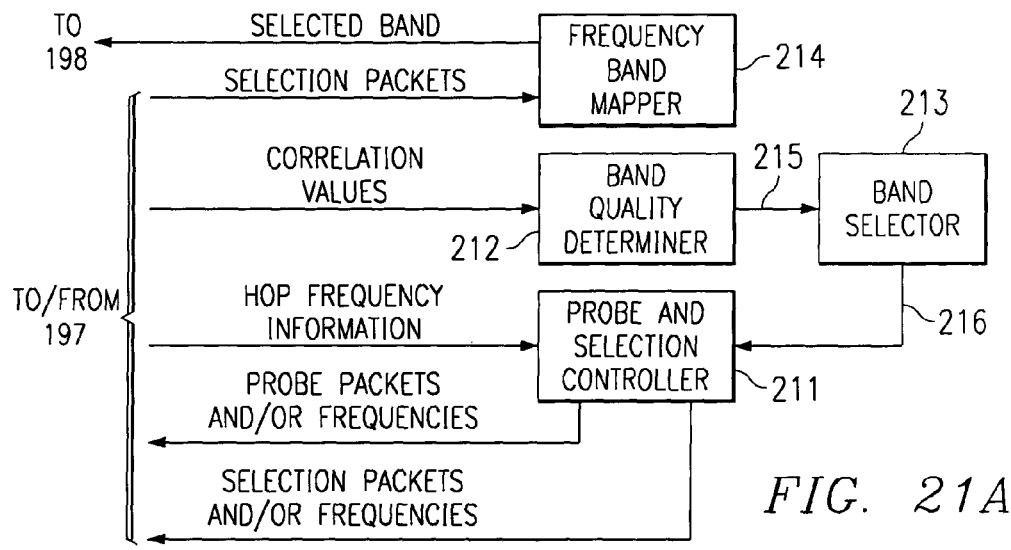
FIG. 21A diagrammatically illustrates pertinent portions of an exemplary embodiment of the mode controller of FIG. 19A.

FIG. 21A diagrammatically illustrates pertinent portions of an exemplary embodiment of the mode controller of FIG. 19A. The embodiment of FIG. 21A includes a probe and selection controller 211 which outputs to the mode 1 transceiver section 197 information indicative of the frequencies on which the probe and selection packets are to be transmitted, and can also provide the probe and selection packets to the mode 1 transceiver section 197, depending upon whether the probe portion or the select portion of the above-described PLS operation is being performed. A band quality determiner 212 receives conventionally available correlation values from the mode 1 transceiver section 197 and determines therefrom band quality information which is provided at 215 to a band selector 213. The band quality information 215 can include, for example, any of the above-described quality parameters. The band selector 213 is operable in response to the quality information 215 to select the preferred frequency band for mode 3 communications. For example, the band selector 213 can use any of the above-described band selection criteria. The band selector 213 outputs at 216 to the probe and selection controller 211 the index of the lowest frequency of the preferred frequency band. The probe and selection controller 211 includes the received index in the selection packets that it provides to the mode 1 transceiver section 197 for transmission to the other transceiver involved in the PLS operation.

The mode controller of FIG. 21A also includes a frequency band mapper 214 which receives selection packets from the other transceiver involved in the PLS operation. The frequency band mapper extracts the index from the selection packets and determines therefrom the selected 22 MHz frequency band. Information indicative of the selected frequency band is output from the frequency band mapper 214 to the mode 3 transceiver section 198, after which mode 3 communication can begin.

Figures 21B, 22:
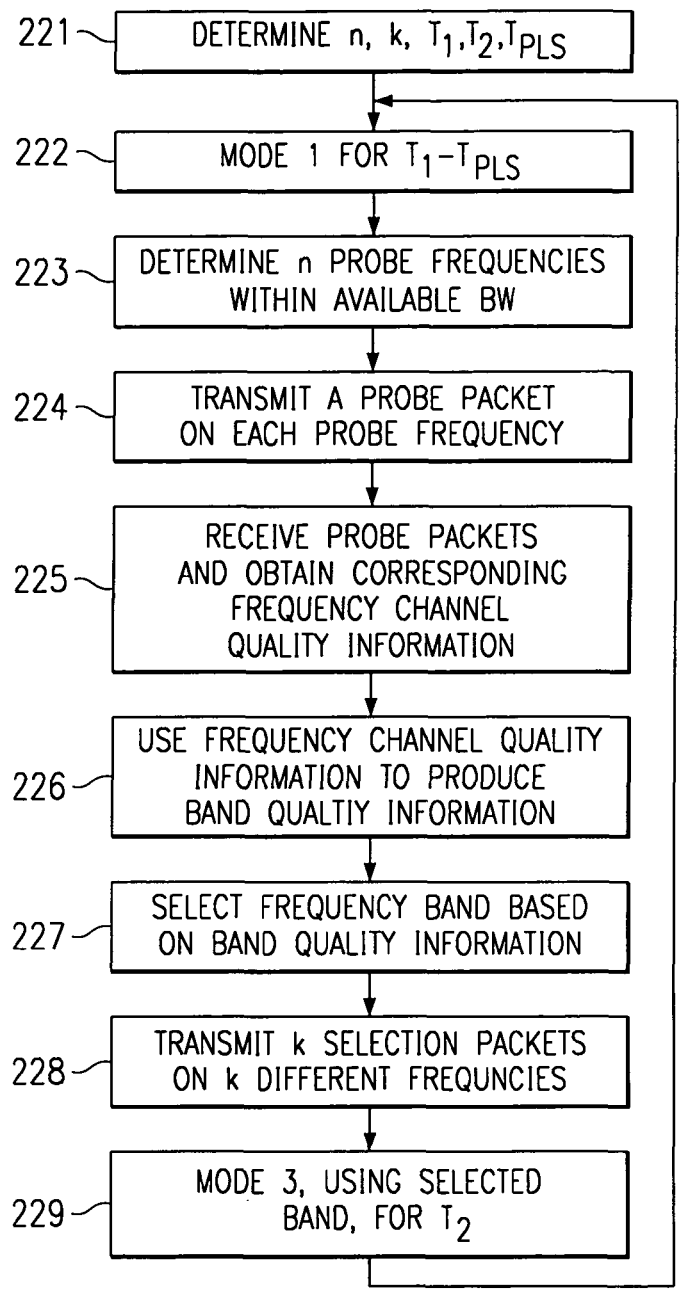
FIG. 21B illustrates exemplary operations which can be performed by the mode controller of FIGS. 19A and 21A.
FIG. 22 diagrammatically illustrates an exemplary format of a selection packet according to the invention.

FIG. 21B illustrates exemplary operations which can be performed by the transceiver of FIGS. 19A and 21A. At 221, the aforementioned parameters n, k, $T_1$, $T_2$ and $T_{PLS}$ are determined, for example, during initial handshaking. At 222, the transceiver operates in mode 1 for a period of time equal to $T_1-T_{PLS}$. Thereafter, at 223, n probe frequencies within the available bandwidth (BW) are determined, and a probe packet is transmitted on each probe frequency at 224. At 225, the probe packets are received and corresponding frequency channel quality information (for example maximum correlation values) is obtained. At 226, the frequency channel quality information is used to produce band quality information, and the band quality information is used at 227 to select a preferred frequency band for mode 3 communication. At 228, k selection packets are transmitted on k different frequencies, each selection packet indicative of the selected frequency band. At 229, mode 3 communications are performed using the selected frequency band for a time period of $T_2$. After expiration of the time $T_2$, mode 1 communications resume at 222, and the above described operations are repeated.

FIG. 14B diagrammatically illustrates pertinent portions of a further exemplary embodiment of the mode controller of FIG. 19A. In the FIG. 14B embodiment, a modulation and coding mapper 141 receives at 142 from the band selector 213 (See FIG. 21A) the band quality information associated with the 22 MHz band selected during the PLS procedure. The modulation and coding mapper 141 maps the band quality information onto, for example, any of the exemplary modulation and channel coding combinations shown at 1-22 in FIGS. 14, 14A, 14C and 14D. At 143, the mapper 141 provides to the mode 3 transceiver section 198 information indicative of the selected modulation and channel coding combination. The mapping operation can be defined, for example, so as to maximize the system throughput given the band quality information of the selected band. In some exemplary embodiments, experimental simulation information similar to that shown in FIG. 13 above, for example, throughput versus band quality for different modulation schemes and also for different coding rates, can be used by the mapper 141 to select the combination of modulation scheme and coding rate that provides the highest throughput, given the band quality of the selected band.

Figure 24:
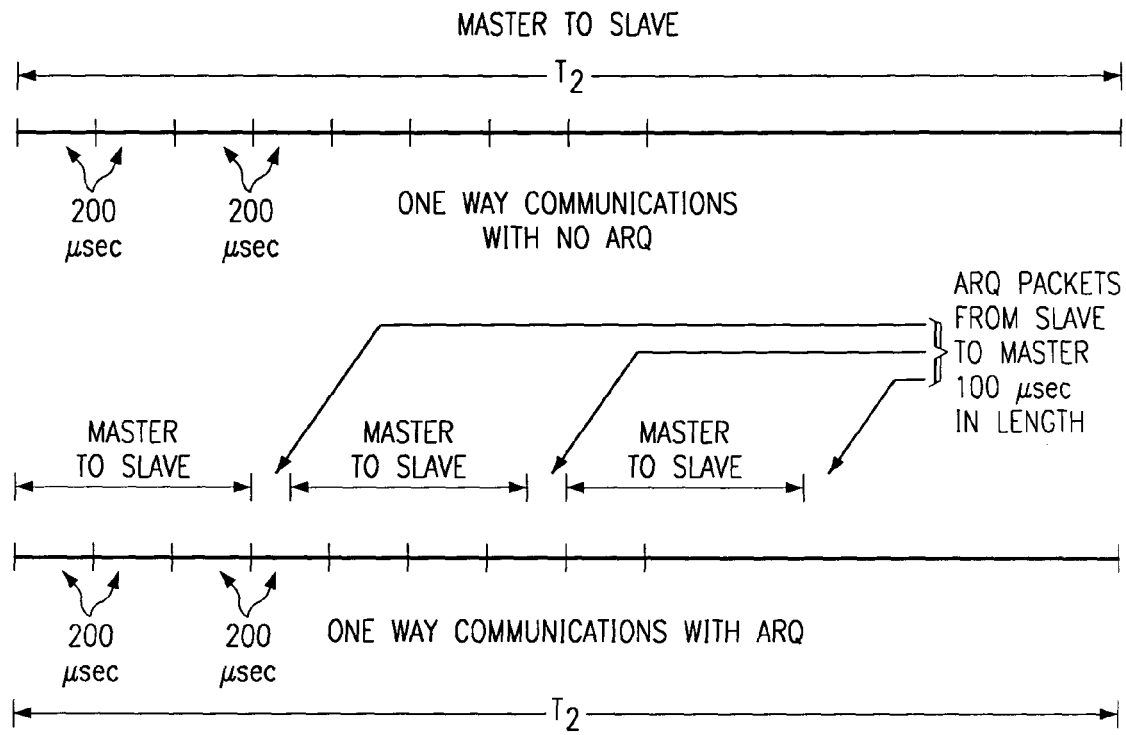
FIGS. 24 and 24A diagrammatically illustrate exemplary time slot formats for mode 3 communication according to the invention.

Referring again to FIGS. 17 and 19, several packets can be transmitted from the master to the slave and vice versa in the time slot period $T_2$ (e.g. 225 ms) allocated for mode 3. A nominal packet size of, for example, 200 microseconds can be used, as shown in FIG. 24. During their initial handshake, the master and the slave can, for example, agree on a certain number of packets to be sent in each direction. They can also agree (during the handshake) on the modulation scheme to be used in each direction.

In an example of one-way communications, and if ARQ (automatic repeat request) is used, the transmitting device can, for example, send a predetermined number of normal packets (also referred to herein as a superpacket). The number of normal packets in the superpacket can be agreed upon in initial handshaking. After receipt of the predetermined number of normal packets, the receiving device can, for example, send a short ARQ packet that is half the length of a normal packet. The ARQ packet can be preceded and followed by guard intervals (e.g. 100 microseconds). The ARQ packet serves to acknowledge the reception of the normal packets. Those packets whose CRC (cyclic redundancy code) did not check correctly are indicated in the ARQ packet. The transmitter can then send the requested packets again in a further superpacket. This procedure can be repeated until all packets get through or a time-out occurs. FIG. 24 shows an exemplary slot format for the case of one-way communication, either from master to slave (explicitly shown) or slave to master (not explicitly shown), with and without ARQ.

Figure 24A:
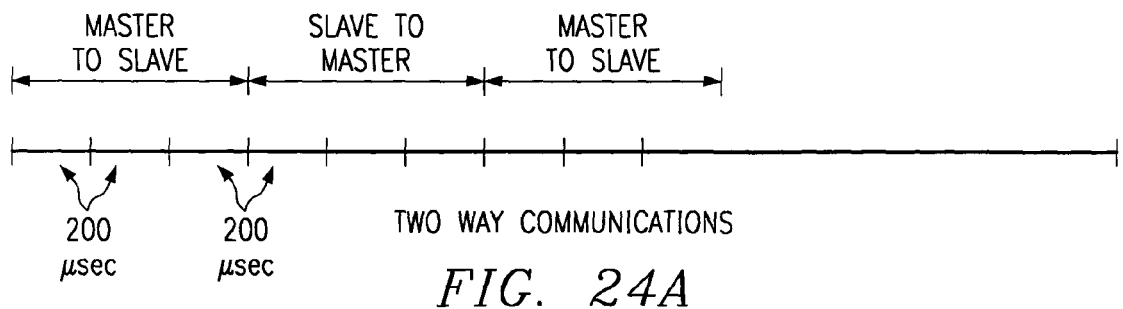

Two-way mode 3 communication from master to slave and slave to master can be handled similarly, as illustrated in the example of FIG. 24A.

Figure 24B:
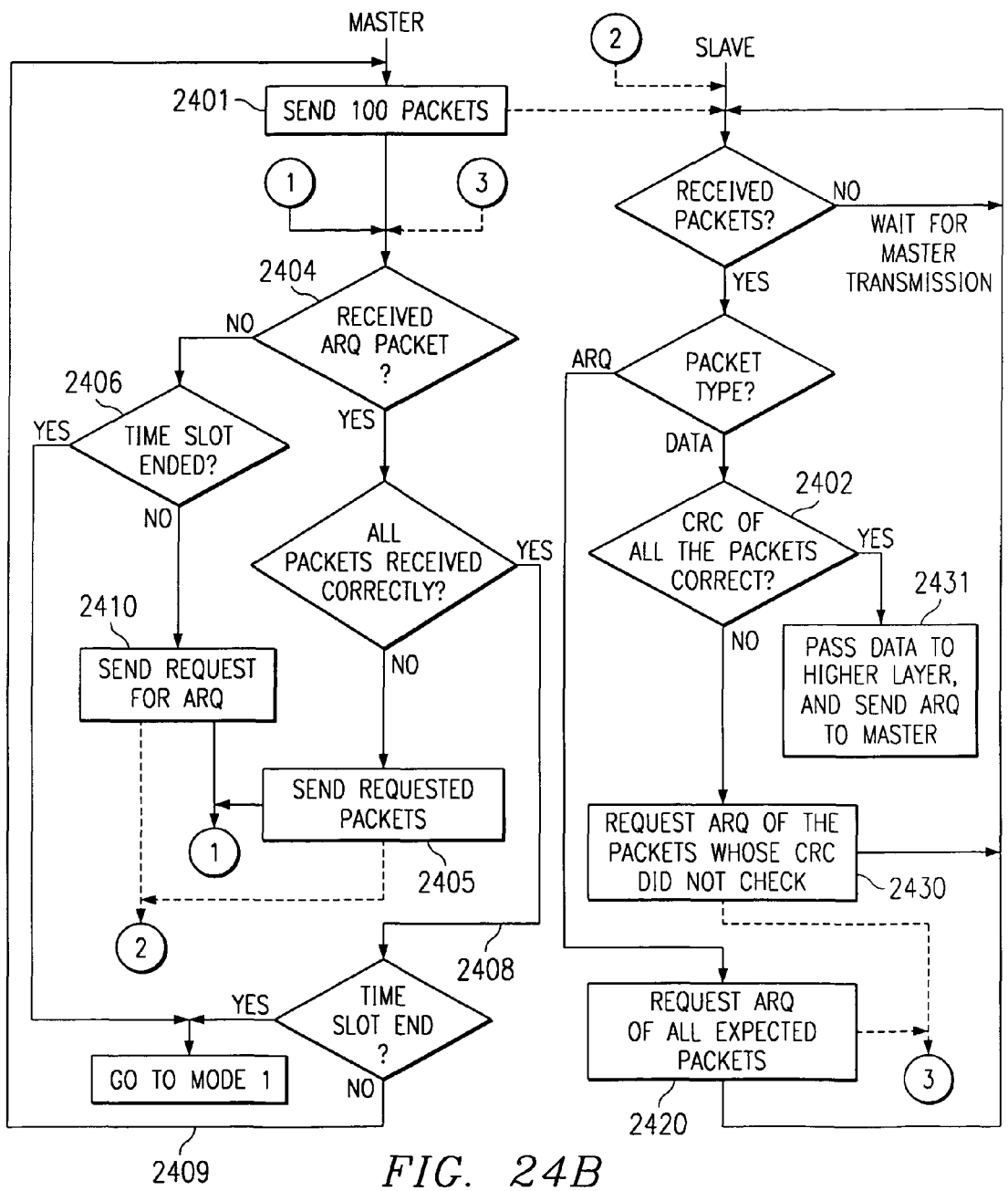
FIG. 24B illustrates exemplary operations of a retransmission technique according to the invention.

ARQ and retransmissions are optional. Retransmissions can increase the mode 3 performance in the presence of an interferer (such as a Bluetooth device). Referring to FIG. 24 for one-way transmission with ARQ, an exemplary retransmission technique (illustrated in FIG. 24B) is as follows:

1. The master sends the slave a superpacket at 2401 including 100 packets with CRC at the end of each packet.

2. The slave uses the CRC at 2402 to determine if the packets were received without error.

3. The slave sends the master an ARQ packet that has a payload of 100 bits (see 2430, 2431 in FIG. 24B). Each bit corresponds to a received packet. The bit is 1 if the packet was received with no error, and is zero if it was received in error. A CRC is appended at the end of the ARQ packet.

4. If the master receives the ARQ packet correctly at 2404, the master retransmits the requested packets (if any) to the slave (see 2405 in FIG. 24B). If the master does not receive the ARQ packet correctly at 2404 (as indicated, for example, by a failed CRC check), then (a) the master sends the slave an ARQ packet of size 100 µsec. (see 2410 in FIG. 24B) asking for the slave's ARQ packet.

(b) the master then listens at 2404 for the slave's ARQ packet.

(c) Steps (a) and (b) are repeated by the master until he receives at 2404 the slave's ARQ packet (sent at 2420 in FIG. 24B) and retransmits the requested packets, if any (see 2408), at 2405, or until the $T_2$ time slot ends at 2406, at which time mode 1 communications begin.

5. Steps 2-4 are repeated until all the packets are received by the slave correctly (see 2408) or the $T_2$ time slot ends.

6. If the $T_2$ time slot does not end during step 4 or step 5 (see 2409), the master sends new packets to the slave.

If the master finishes sending all its packets before the $T_2$ time slot ends, it can go to mode 1 and communicate with other Bluetooth devices. For example, if MPEG 2 of rate 18 Mbps is being transmitted, six frames (250 ms of video) would require 204.5 ms at the rate of 22 Mbps. If $T_1+T_2=250$ ms, and 10 ms are used for retransmission requests and retransmissions, and if 7.5 ms is used for PLS, this would leave the master 28 ms for mode 1 Bluetooth communications.

Retransmissions for two-way communications (See FIG. 24A) can be accomplished similarly to the above-described one-way communications. The slave device's ARQ requests maybe piggybacked onto the slave data packets, or independent ARQ packets can be utilized.

Figure 24C:
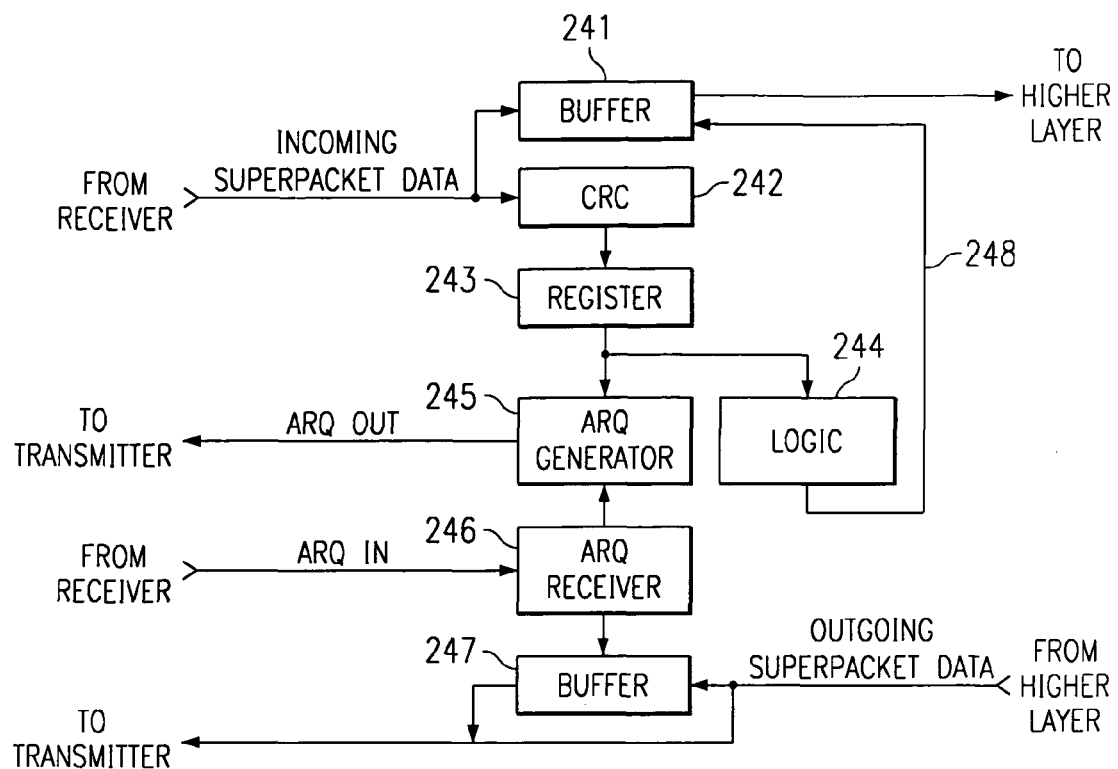
FIG. 24C illustrates pertinent portions of an exemplary transceiver embodiment that can implement operations shown in FIG. 24B.

FIG. 24C diagrammatically illustrates pertinent portions of exemplary embodiments of a mode 3 transceiver capable of implementing the exemplary retransmission technique described above and illustrated in FIG. 24B. In FIG. 24C, the incoming superpacket data is applied to a CRC decoder 242 which performs a CRC check for each packet of the superpacket. For a given packet, the CRC decoder 242 can shift a bit into the register 243, for example a bit value of 1 if the CRC for the packet checked correctly, and a bit value of 0 if the CRC for the packet did not check correctly. Thus, the register 243 will be loaded with a bit value for each packet of the superpacket. The bit values contained in the register 243 are input to logic 244 which determines whether or not the CRC of every received packet checked correctly. If so, the logic output 248 signals a buffer 241, into which the incoming superpacket data has been loaded, that the superpacket data can be passed on to a higher layer. On the other hand, if the logic 244 determines that the CRC of one or more of the received packets did not check correctly, then the logic output 248 signals the buffer 241 to hold the superpacket data.

The contents of register 243 are also provided to an ARQ generator 245 which uses the register contents to fill the payload of an outgoing ARQ packet. When a superpacket including retransmitted packets is received, the retransmitted packets are buffered into their appropriate superpacket locations in buffer 241, and the CRC decoder 242 performs a CRC check for each retransmitted packet, providing the CRC results to the register 243.

An ARQ receiver 246 receives incoming ARQ packets and responds thereto either by prompting the ARQ generator 245 to send an appropriate ARQ packet, or by selecting requested packets of a previously buffered (see 247) outgoing superpacket for retransmission to the other side.

Point-to-multipoint communications can be achieved by time division multiplexing between various slaves. Each time slot for each slave can be preceded by a PLS slot between the master and the concerned slave.

Figure 25:
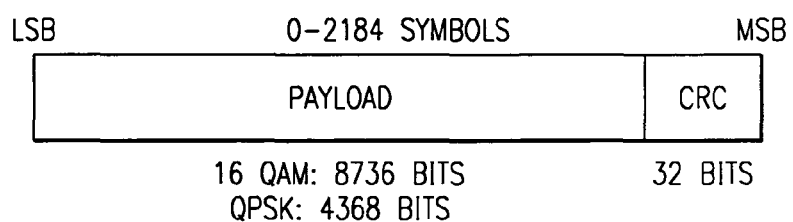
FIG. 25 illustrates an exemplary packet format for use with the time slot formats of FIG. 24.

In some embodiments, each 200 µsec. length packet in FIG. 24 includes data bits (payload) and a CRC of length 32 bits. The CRC is a 32-bit sequence generated, for example, using the following polynomial $D^{32}+D^{26}+D^{23}+D^{22}+D^{16}+D^{12}+D^{11}+D^{10}D^8+D^7+D^5+D^4+D^2+1$. This exemplary packet format is shown in FIG. 25.

Figure 25A:
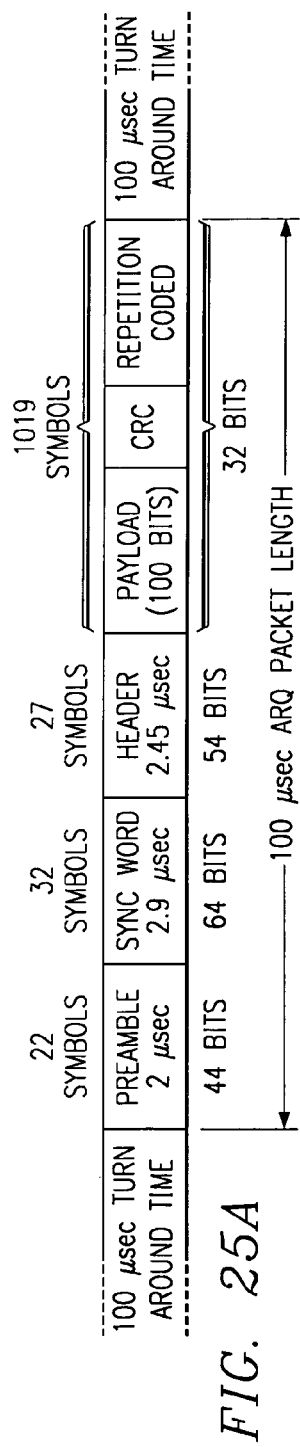
FIG. 25A illustrates an exemplary ARQ packet format according to the invention.

FIG. 25A illustrates an exemplary ARQ packet format according to the invention. The ARQ packet format of FIG. 25A is generally similar to the packet format shown in FIG. 25, and includes the training sequence of FIG. 26. The payload of the FIG. 25A packet is protected by a repetition code. The size of the FIG. 25A packet can be specified in its header, or can be determined by the master based on: the number of packets in the superpacket sent by the master multiplied by the repetition code rate; the number of CRC bits; and the number of training bits.

Figure 26:
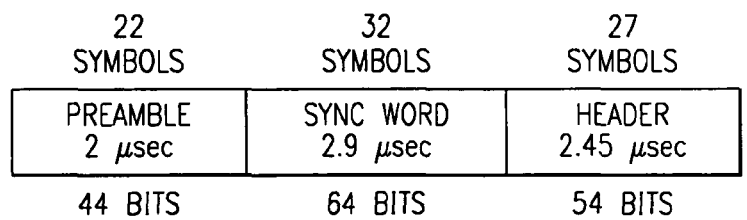
FIG. 26 diagrammatically illustrates an exemplary format of a training sequence which can be used in conjunction with the packet format of FIG. 25.
Figure 27:
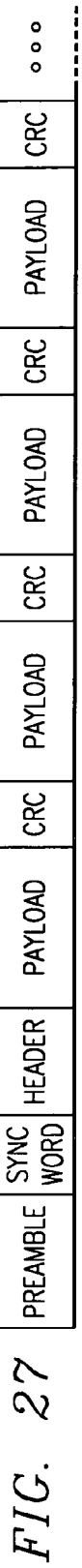
FIG. 27 illustrates a portion of the slot format of FIG. 24 in more detail.

Several of the packets in FIG. 24, the number of which can be agreed upon in the initial handshake, are preceded by a training sequence for acquisition of timing, automatic gain control and packet timing. Typically 10 packets are preceded by the training sequence. FIG. 26 shows an exemplary format of the training sequence. FIG. 27 illustrates diagrammatically a portion of the above-described exemplary slot format of period $T_2$ in mode 3, including the training sequence (see also FIG. 26) and the CRC.

The preamble of the FIG. 26 training sequence includes the pattern (1+j)*1, −1, 1, −1, 1, −1, 1 −1, 1, −1, 1, −1, 1 −1, 1, −1, 1, −1, 1, −1, 1, −1] and it aids in the initial symbol timing acquisition by the receiver. The preamble is followed in this FIG. 26 example by the 64-bit Bluetooth sync. word transmitted using quadrature phase shift keying (QPSK), implying a 32 symbol transmission in mode 3. The sync. word is followed by the header transmitted using QPSK modulation. The farthest constellations in the 16 QAM are employed for the transmission of the preamble, sync. word and header (see FIG. 6). Referring also to FIG. 27, the header is followed by payload such that the total time occupied by the packet is 200 microseconds. The payload is followed by the 32-bit CRC.

It should be understood that the above-described slot and packet formats are exemplary only and that, for example: the packet length can be set to any desired length; a different size polynomial can be used for the CRC; and a different size training sequence can be used with the preamble, sync word and header sized as desired. It should also be understood that the above-described slot and packet formats are readily applicable to two-way communications.

The exemplary slot and packet formats described above permit, for example, transmission of HDTV MPEG2 video at 18 Mbps. Assume, for example, that 24 frames/sec. is transmitted for MPEG 2 video. Thus, the master transmits to the slave 100 packets each of length 200 μsec. carrying a data payload of 2184 symbols. Assuming, for example, that 10 such packets are preceded by the training sequence of 81 symbols (FIG. 26), and that 16 QAM with rate ½ coding is used, 206.8 msec. is needed for transmission of 6 video frames. Assuming a 9% ARQ rate implies that the total time required for 6 video frames is 225 msec. FIG. 28 summarizes exemplary transmission parameters for HDTV MPEG2 video transmission using mode 3.

Figure 29:
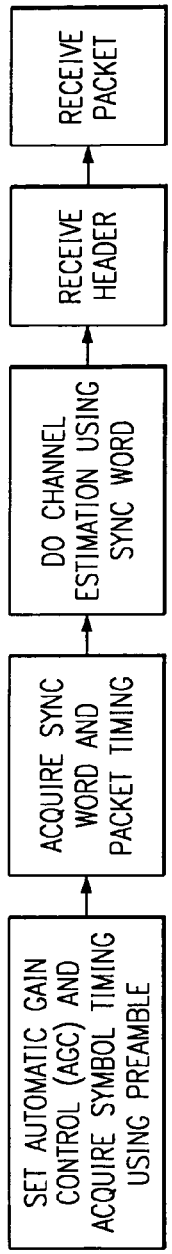
FIG. 29 diagrammatically illustrates exemplary acquisition and packet reception algorithms for mode 3 operation according to the invention.
Figure 30:
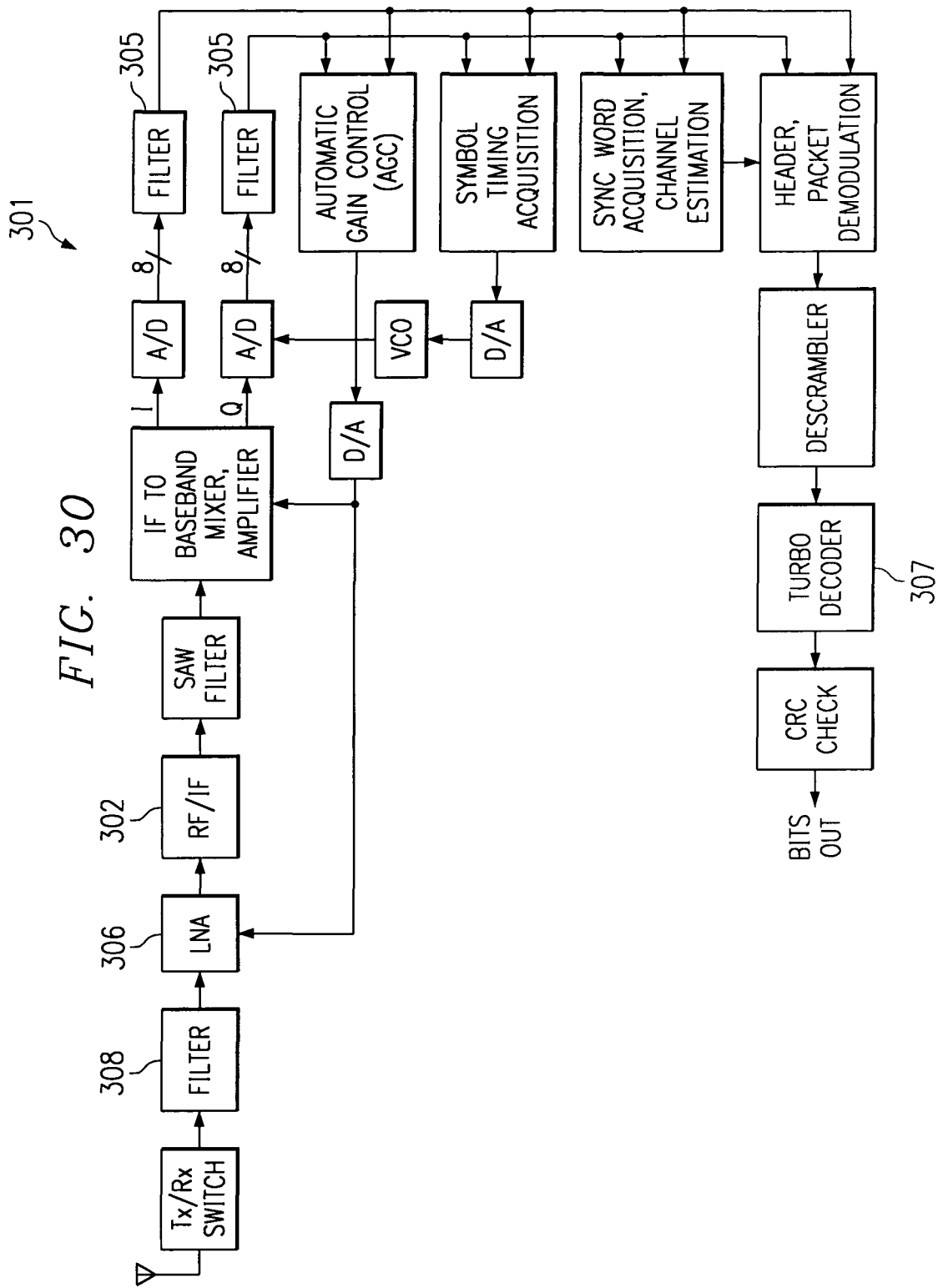
FIG. 30 diagrammatically illustrates an exemplary embodiment of a mode 3 receiver according to the invention which can implement the algorithms of FIG. 29.

The receiver algorithms for acquisition and packet reception in mode 3 are similar to mode 2. An exemplary block diagram of mode 3 receiver algorithms is shown in FIG. 29. An exemplary receiver embodiment for mode 3 is shown diagrammatically in FIG. 30. The demodulator of FIG. 30 shown generally at 301 can include, for example, channel estimation, equalization, and symbol-to-bit mapping.

Figure 31:
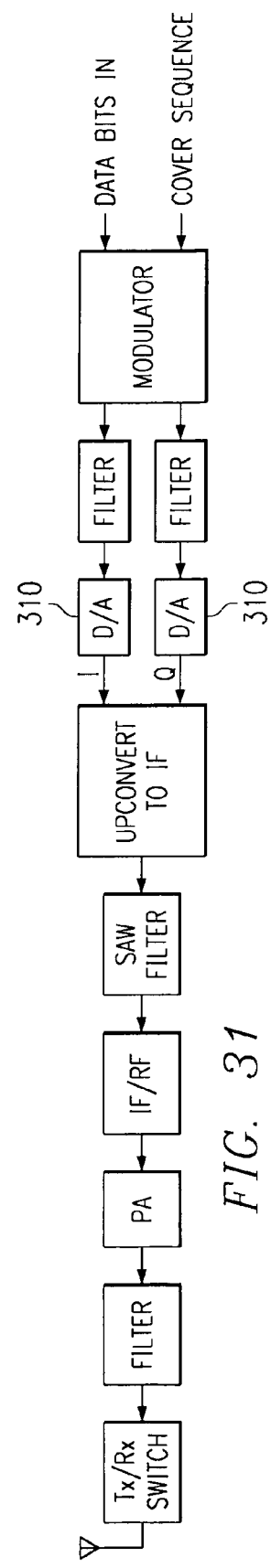
FIG. 31 diagrammatically illustrates an exemplary embodiment of a mode 3 transmitter according to the invention.

An exemplary transmitter embodiment for mode 3 is shown in FIG. 31. Each D/A converter 310 on the I and Q channels can be, for example, an 6-bit 44 MHz converter. The transmitter and receiver of FIGS. 31 and 30 can be used together to form the exemplary mode 3 transceiver of FIG. 19A above.

Figure 32:
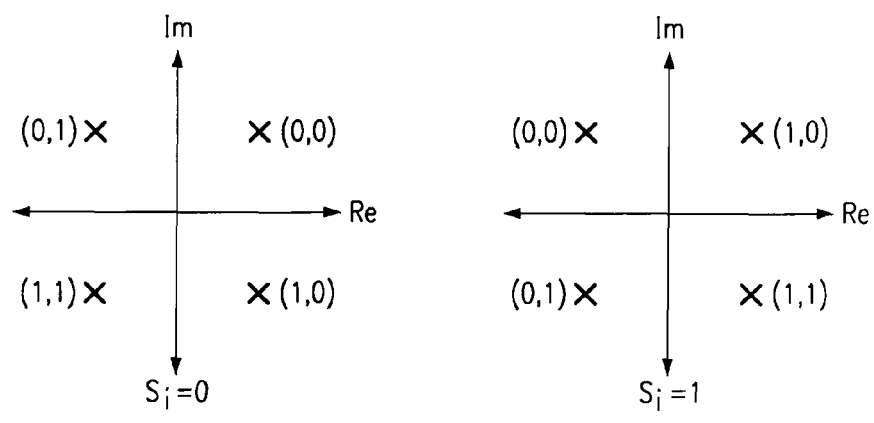
FIGS. 32 and 32A graphically illustrates an exemplary mapping of bits to symbols which can be used in mode 3 operation.
Figure 32A:
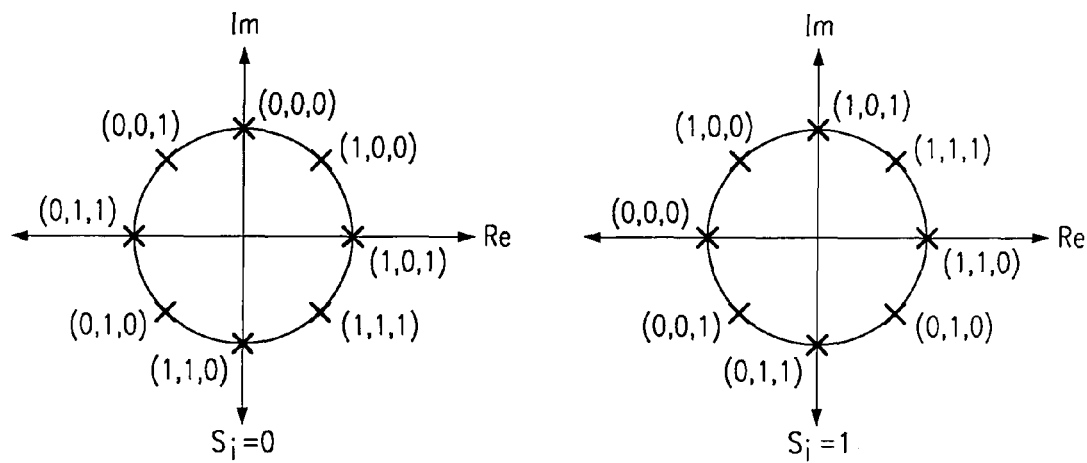
Figure 33:
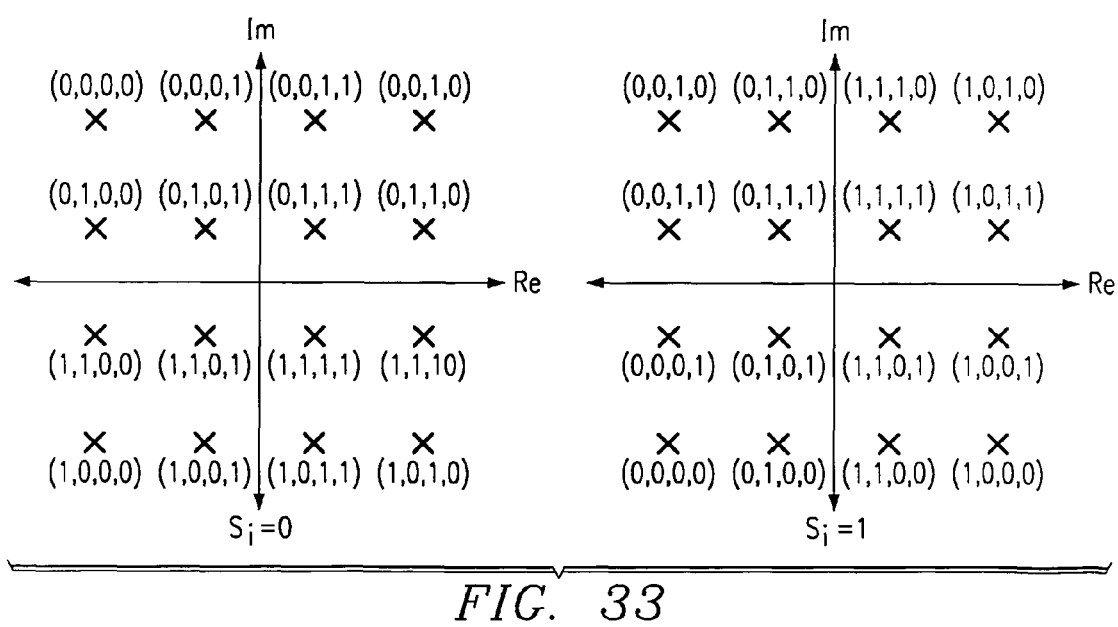
FIG. 33 graphically illustrates another exemplary mapping of bits to symbols which can be used in mode 3 operation.

In some exemplary embodiments, modulation options such as QPSK, 16-QAM and 8-PSK (8-ary phase shift keying) can be used in mode 3, as shown in FIGS. 32, 32A and 33. Referring to the QPSK example of FIG. 32, an exemplary cover sequence S, such as used in IEEE 802.11, is used to spread the transmitted symbols. The mapping from bits to symbols is shown in FIG. 32. Referring to the 8-PSK example of FIG. 32A, the cover sequence S, as used in IEEE 802.11, is used to spread the transmitted symbols. The mapping from bits to symbols is shown in FIG. 32A. Referring to the 16-QAM example of FIG. 33, the cover sequence (also referred to herein as a scrambling code) S, as used in IEEE 802.11, is used to spread the transmitted symbols. The mapping from bits to symbols is shown in FIG. 33. In the examples of FIGS. 32 and 33, $S_i$ represents the ith member of the sequence S, and is either 1 or 0. In some embodiments, no cover sequence is used, in which case the constellations associated with either value of S can be used.

Figure 34:
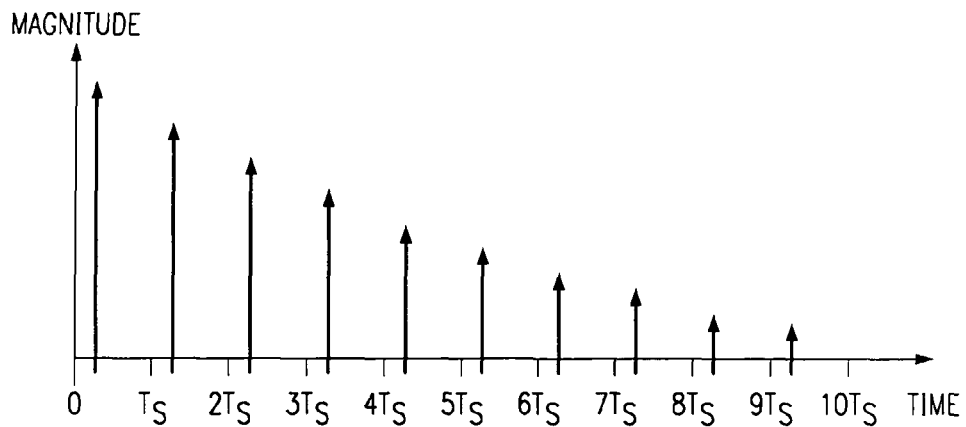
FIG. 34 graphically illustrates a typical channel impulse response encountered by transceivers according to the invention.

The exponentially delayed Rayleigh channel example shown in FIG. 34 is typical of an anticipated operating environment and may therefore be used to test performance. The complex amplitudes of the channel impulse response of FIG. 34 are given by $$h_i = N(0, \sigma_k^2/2) + jN(0, \sigma_k^2/2)$$

$$\sigma_k^2 = \sigma^2 e^{-kT_s/T_{RMS}}$$

$$\sigma_0^2 = 1 - e^{-T_s/T_{RMS}}$$

$$T_{RMS} = 25$$

This channel model requires equalization (at the outputs of the filters 305 in FIG. 30), and this can be done in a variety of ways, two conventional examples of which are described below with respect to FIGS. 35 and 36.

Figure 35:
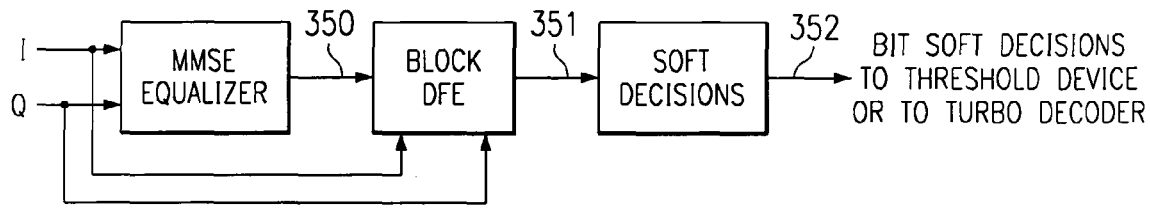
FIG. 35 diagrammatically illustrates an exemplary embodiment of an equalizer section which can be used to provide equalization of the channel model of FIG. 34.

A block diagram of an exemplary MMSE (minimum mean squared error) equalizer section is shown in FIG. 35. The equalizer section includes an MMSE equalizer, followed by a block DFE (decision feedback equalizer). The MMSE produces at 350 decisions on all the symbols using the minimum mean squared error criterion and an estimate of the channel. The DFE subtracts the decisions of all the symbols obtained by the MMSE from the input signal and then produces at 351 matched filter soft-decisions on all the symbols. These are then fed to a soft-decisions block that produces at 352 soft decisions on the bit-level. These bit-level soft decisions are in turn fed to the turbo-decoder 307 (see FIG. 30) or to a threshold device in the case of an uncoded system.

Figure 36:
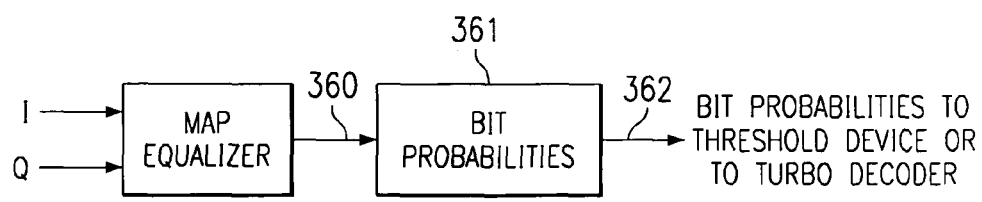
FIG. 36 diagrammatically illustrates another exemplary equalizer section which can be used to equalize the channel model of FIG. 34.

The exemplary MAP equalizer section of FIG. 36 maximizes the a posteriori probabilities of the transmitted symbols given the received signal and an estimate of the channel. These symbol probabilities 360 are then converted to bit probabilities by summing over the symbols at 361. These bit probabilities 362 are then input to the turbo decoder or a threshold device.

Figure 37:
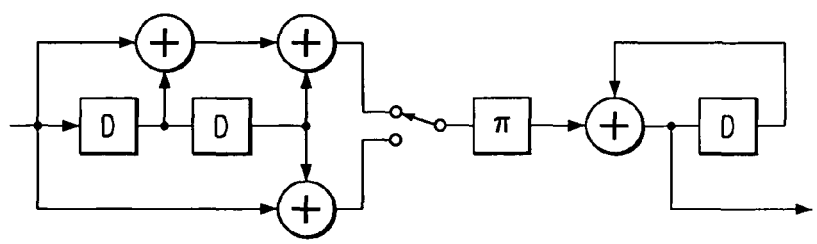
FIG. 37 diagrammatically illustrates an exemplary turbo coder for use in conjunction with mode 3 operation according to the invention.

Video transmission typically requires a BER of $10^{-8}$, so turbo coding is used to achieve this error rate. Parallel concatenated convolutional codes (PCCC) are known to have an error floor at about $10^{-7}$, while serial concatenated convolutional codes (SCCC) do not have an error floor and can meet the BER requirements. The SCCC in FIG. 37 is conventional, and was originally proposed by Divsalar and Pollara in "Serial and Hybrid Concatenated Codes with Applications," Proceedings International Symposium of Turbo Codes and Applications, Brest, France, September 1997, pp. 80-87, incorporated herein by reference.

Figure 38:
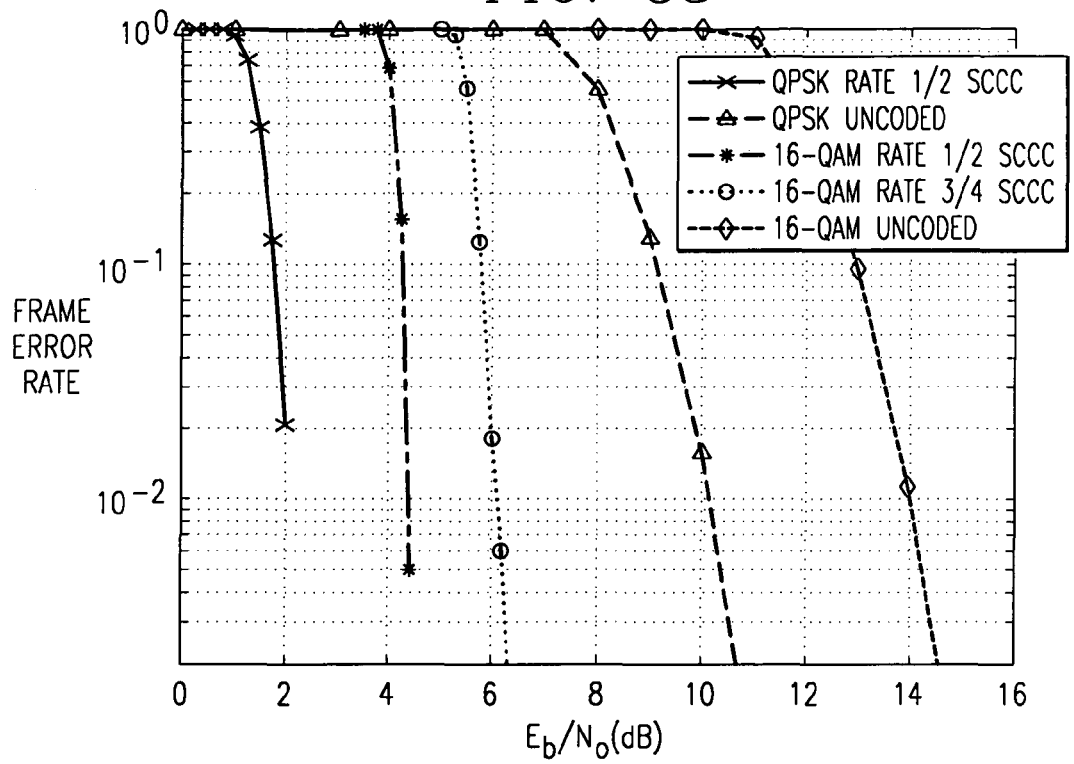
FIGS. 38-44 graphically illustrate exemplary simulation results for mode 3 operation in various communication channels.
Figure 39:
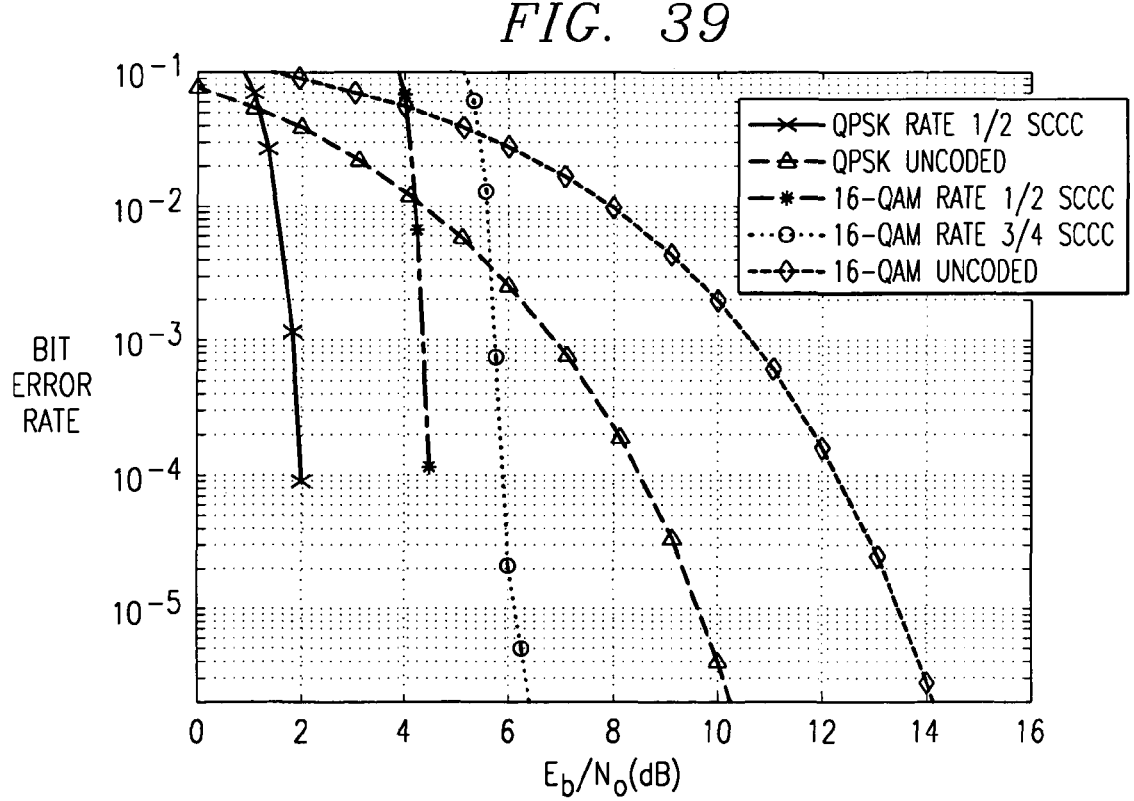
Figure 40:
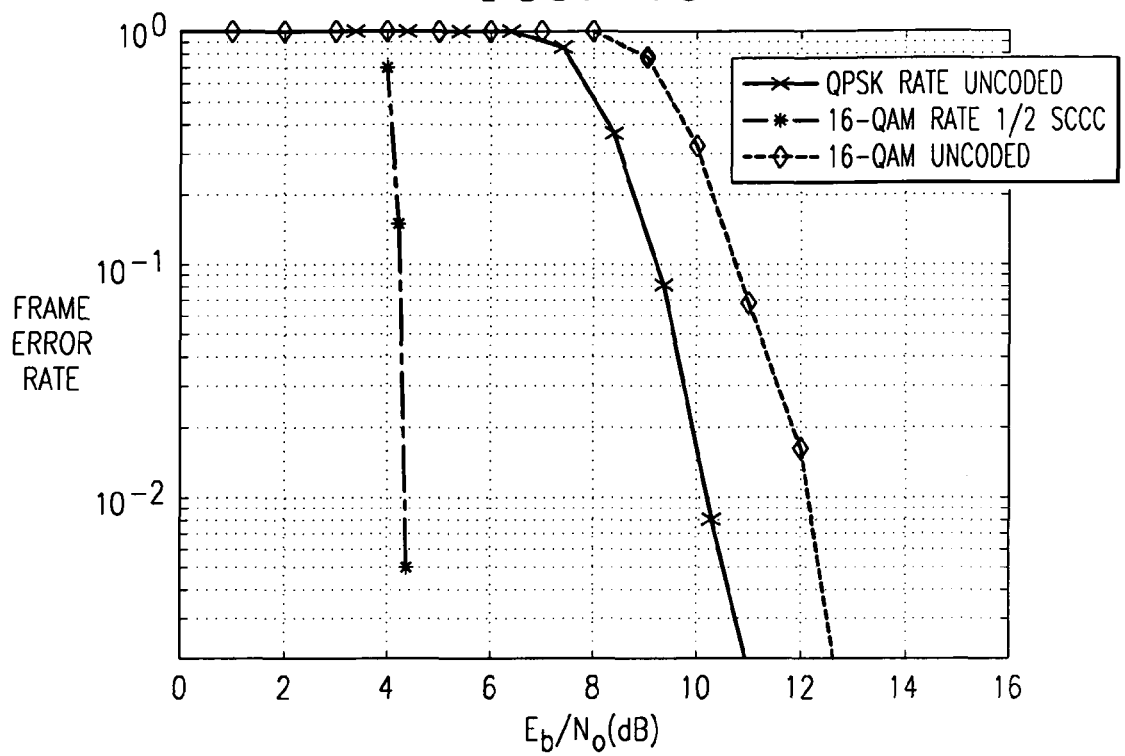
Figure 41:
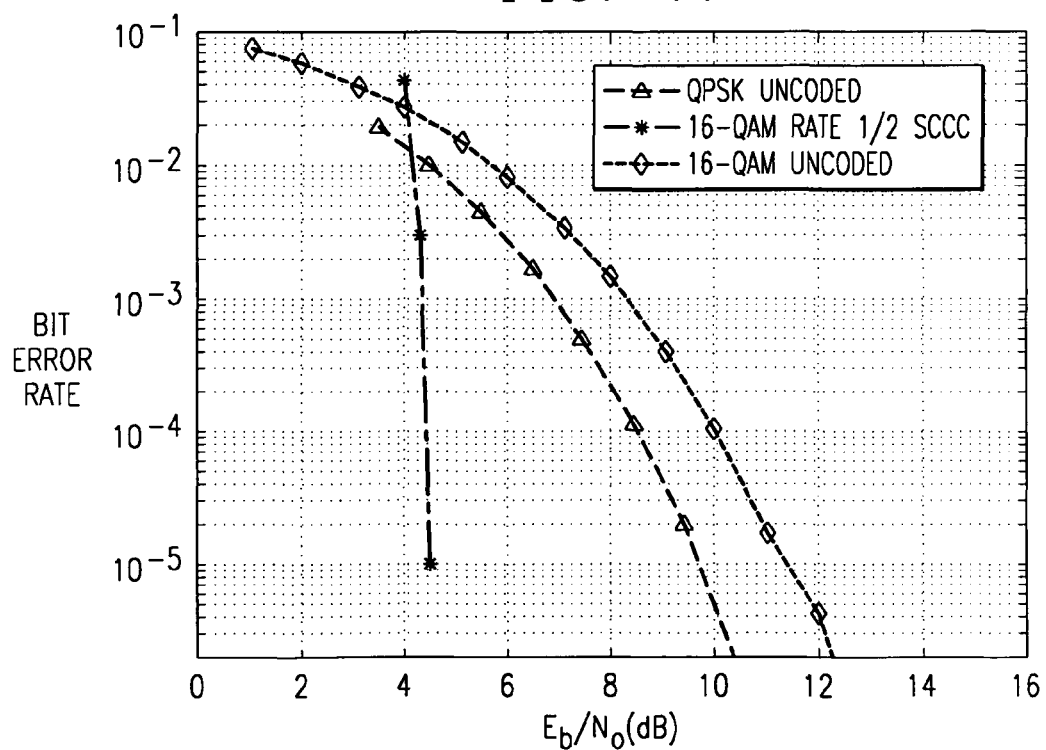
Figure 42:
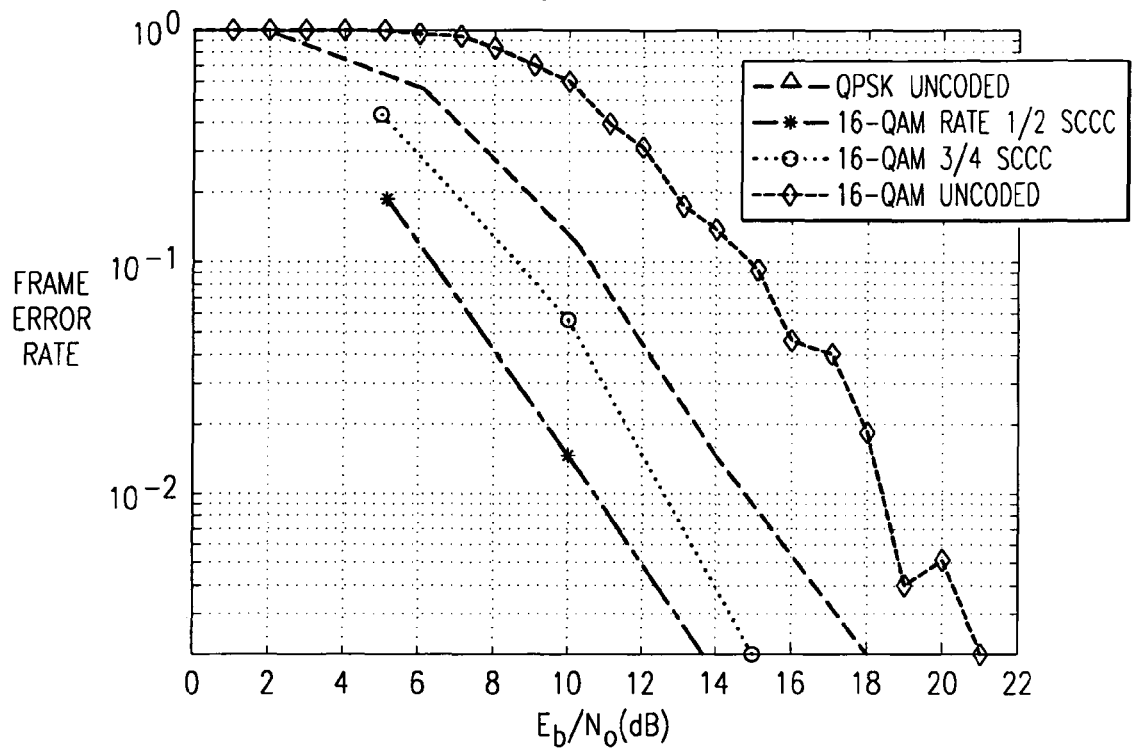
Figure 43:
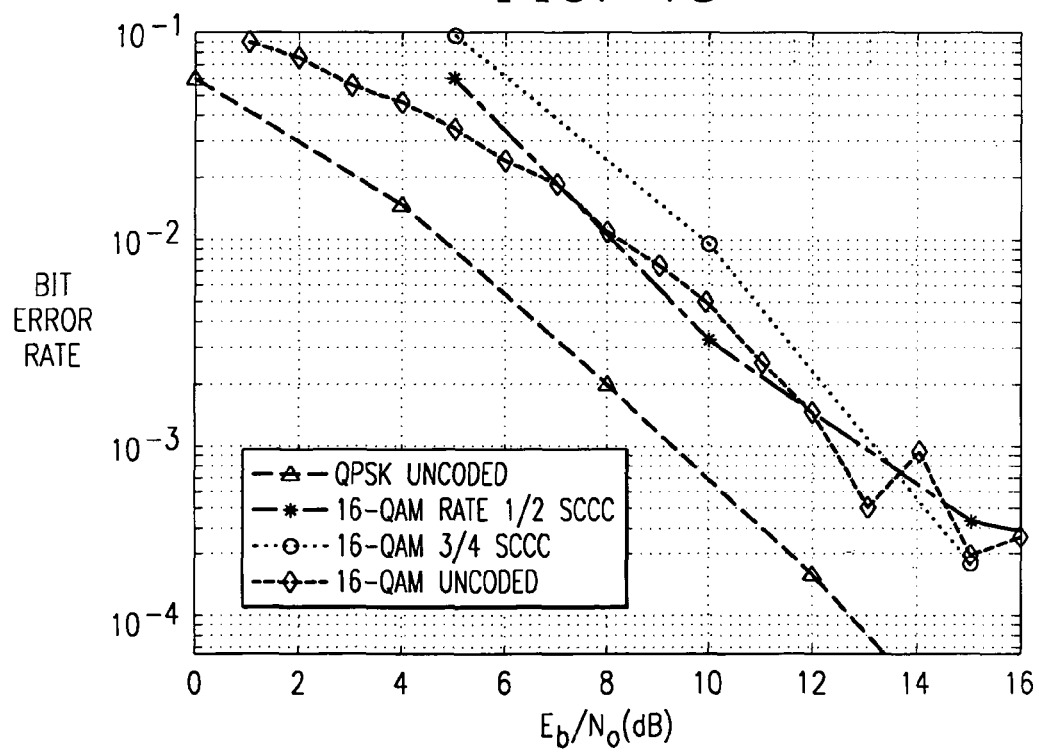
Figure 44:
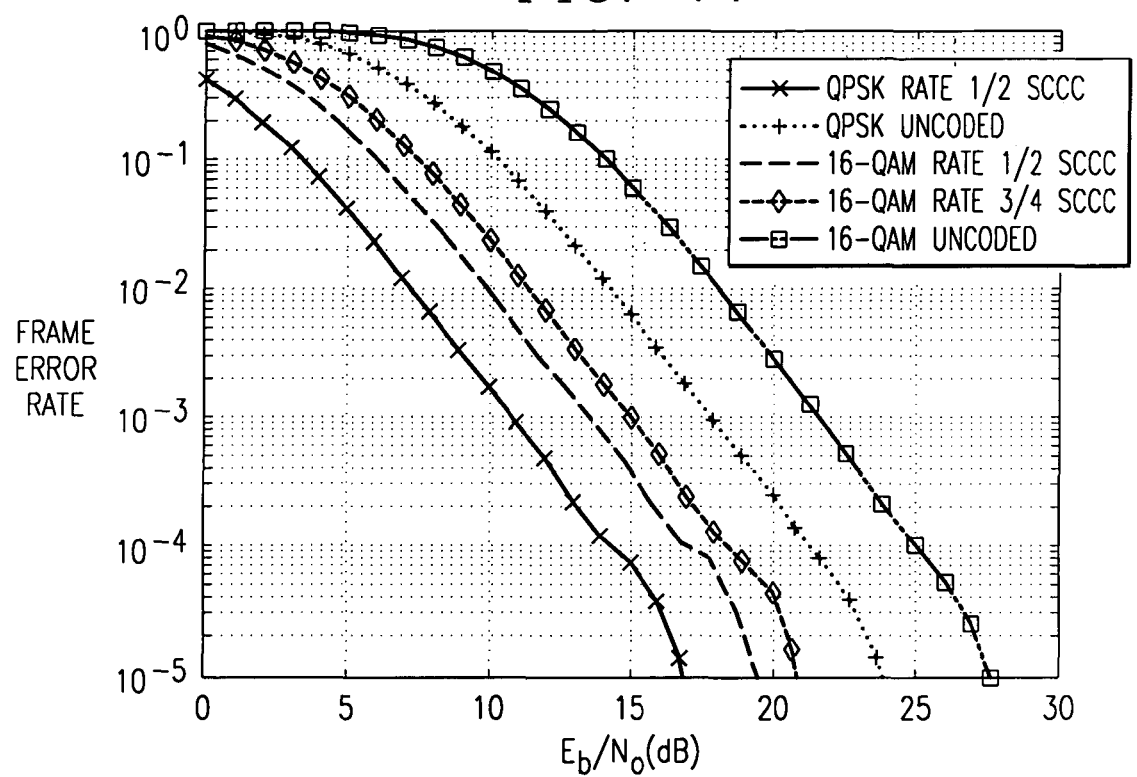

Exemplary results of Monte-Carlo simulations for mode 3 are given in FIGS. 38-44. In all simulations a frame size with 4096 information bits was used. FIGS. 38 and 39 show the FER and BER in an AWGN channel. FIGS. 40 and 41 show the FER and BER in the IEEE 802.15.3 multipath channel without fading. FIGS. 42 and 43 show the FER and BER in the IEEE 802.15.3 multipath channel with fading. FIG. 44 shows the FER in a single-path Rayleigh fading channel.

Due to typical transceiver size constraints, a single antenna may be desirable for transmit and receive according to the invention. However, it is possible to use two antennas for transmit and receive diversity. Simple schemes like switched diversity can be easily incorporated in a given transceiver device according to the invention, while also being transparent to other devices (e.g. in a Bluetooth piconet). The modulation techniques described above are also applicable to more complex transmit diversity techniques such as, space time coding, beam forming and others.

The aforementioned modulation schemes of the invention also allow more complex coding schemes like parallel concatenated trellis coded modulation (PCTCM) and serially concatenated trellis coded modulation (SCTCM). Also, a lower complexity trellis code (which can perform better than the turbo coding of FIG. 37) can easily be incorporated in transceiver devices according to the invention.

As discussed above, FIGS. 10 (receiver) and 11 (transmitter) illustrate an exemplary transceiver for mode 2. Many parts of the mode 2 receiver, for example, the front end filter 105, LNA 106, RF/IF converter 107, and the SAW filter 108 can be shared with mode 1. The baseband for a mode 2 receiver requires additional logic (beyond mode 1) for receive filtering, AGC, timing acquisition, channel estimation, QAM demodulation and Viterbi decoding in the case of ARQ. In some embodiments, the extra gate count for this additional logic is approximately 10,000 gates.

As discussed above, FIGS. 30 (receiver) and 31 (transmitter) illustrate an exemplary transceiver for mode 3. Many parts of the mode 3 receiver, for example, the front end filter 308, LNA 306, and RF/IF converter 302 can be shared with mode 1. The implementation of mode 1+mode 3 will require an additional SAW filter over a mode 1 implementation because of the larger bandwidth of mode 3 compared to mode 1. The baseband for a mode 3 receiver requires additional logic (beyond mode 1) for AGC, timing acquisition, channel estimation, QAM demodulation, equalization and turbo decoding. In some embodiments, the extra gate count for this additional logic is approximately 100,000 gates.

It will be evident to workers in the art that exemplary transceiver embodiments according to the invention can be realized, for example, by making suitable hardware and/or software modifications in a conventional Bluetooth MAC. Some exemplary advantages provided by the invention as described above are listed below.

Interoperability with Bluetooth: a high rate WPAN piconet according to the invention can accommodate several mode 1 (Bluetooth) and mode 2 or mode 3 devices simultaneously.

High Throughput: in mode 3 a high rate WPAN according to the invention supports 6 simultaneous connections each with a data rate of 20 Mbps giving a total throughput of 6×20=120 Mbps over the whole 2.4 GHz ISM band. In mode 2 the high rate WPAN supports the same number of connections as Bluetooth with a data rate of up to 4 Mbps each.

Coexistence: there is only a 10% reduction in throughput for Bluetooth in the vicinity of an exemplary WPAN according to the invention. The PLS technique implies a 0% reduction in throughput for IEEE 802.11 in the vicinity of a WPAN according to the invention because PLS will select a different frequency band.

Jamming Resistance: the PLS technique helps avoid interference from microwave, Bluetooth and IEEE 802.11, thus making it robust to jamming.

Low Sensitivity Level: exemplary sensitivity level for mode 2 is −78 dBm and for mode 3 is −69 dBm.

Low Power Consumption: the estimated power consumption for mode 2 in year 2001 is 25 mW average for receive and 15 mW average for transmit, and the estimated power consumption for mode 3 in year 2001 is 95 mW average for receive and 60 mW average for transmit.

Although exemplary embodiments of the invention are described above in detail, this does not limit the scope of the invention, which can be practiced in a variety of embodiments.

What is claimed is:

1. A method of selecting a frequency band, comprising:
communicating a plurality of signals encoded in a first mode at different respective times on a respective plurality of frequencies within a frequency bandwidth;
obtaining information indicative of channel quality associated with the communicated plurality of frequencies;
communicating signals in a second mode in response to said obtained information on at least one frequency of the plurality of frequencies, the signals encoded in a second mode different from the first mode; and
selecting the frequency band from contiguous frequencies of the plurality of frequencies.

2. The method of claim 1, wherein the frequency band has a bandwidth less than the frequency bandwidth.

3. The method of claim 1, wherein the plurality of frequencies are distributed evenly across the frequency bandwidth.

4. The method of claim 1, wherein the plurality of frequencies are selected in a pseudo random sequence across the frequency bandwidth.

5. The method of claim 1, wherein the step of communicating the plurality of signals encoded in the first mode comprises receiving the plurality of signals encoded in the first mode, and wherein the step of communicating the plurality of signals encoded in the second mode comprises receiving the plurality of signal encoded in the second mode.

6. The method of claim 1, wherein the step of communicating the plurality of signals encoded in the first mode comprises transmitting the plurality of signals encoded in the first mode, and wherein the step of communicating the plurality of signals encoded in the second mode comprises transmitting the plurality of signals encoded in the second mode.

7. The method of claim 1, wherein said information includes correlation values associated with each of the plurality of frequencies.

8. The method of claim 1, wherein the first mode comprises a first data rate, and wherein the second mode comprises a second data rate different from the first data rate.

9. The method of claim 1, wherein the second mode comprises one of 16-QAM and 8-PSK, and having a coding rate that is one of $1/3$, $1/2$, $2/3$, $3/4$, $4/5$, $5/6$ and 1.

10. A method of selecting a frequency band, comprising:
communicating a plurality of first mode encoded signals on a respective plurality of frequencies within a frequency bandwidth at different respective times;
obtaining channel quality information corresponding to correlation values associated with the communicated plurality of frequencies;
communicating a plurality of second mode encoded signals on at least one frequency of the plurality of frequencies in response to the channel quality information; and
selecting the frequency band from contiguous frequencies of the plurality of frequencies.

11. The method of claim 10, wherein the frequency band has a bandwidth less than the frequency bandwidth.

12. The method of claim 10, wherein the plurality of frequencies are distributed evenly across the frequency bandwidth.

13. The method of claim 10, wherein the plurality of frequencies are selected in a pseudo random sequence across the frequency bandwidth.

14. The method of claim 10, wherein the step of communicating the plurality of signals in the first mode comprises receiving a plurality of signals in the first mode, and wherein the step of communicating the plurality of signals in the second mode comprises receiving a plurality of signals in the second mode.

15. The method of claim 10, wherein the step of communicating the plurality of signals in the first mode comprises transmitting a plurality of signals in the first mode, and wherein the step of communicating the plurality of signals in the second mode comprises transmitting signals in the second mode.

16. The method of claim 10, wherein the first mode comprises signals encoded in a first mode, and the second mode comprises signals encoded in a second mode different from the first mode.

17. The method of claim 10, wherein the first mode comprises signals communicated at a first data rate, and the second mode comprises signals communicated at a second data rate different from the first data rate.

\* \* \* \* \*